United States Patent
Saldana et al.

(10) Patent No.: US 11,907,912 B2
(45) Date of Patent: Feb. 20, 2024

(54) SCHEDULING SYSTEM AND USER INTERFACES

(71) Applicant: Mindbody, Inc., San Luis Obispo, CA (US)

(72) Inventors: Joseph V. Saldana, San Luis Obispo, CA (US); Nicholas James VanMeter, Windsor, CO (US); Charlie Sibbach, Atascadero, CA (US); Nicole Shipley, Boston, MA (US); Yelizaveta Plotnikova, San Luis Obispo, CA (US)

(73) Assignee: Mindbody, Inc., San Luis Obispo, CA (US)

( * ) Notice: Subject to any disclaimer, the term of this patent is extended or adjusted under 35 U.S.C. 154(b) by 302 days.

(21) Appl. No.: 17/302,609

(22) Filed: May 7, 2021

(65) Prior Publication Data

US 2021/0264380 A1 Aug. 26, 2021

Related U.S. Application Data

(63) Continuation of application No. 15/043,256, filed on Feb. 12, 2016, now Pat. No. 11,004,040.

(60) Provisional application No. 62/116,087, filed on Feb. 13, 2015.

(51) Int. Cl.
G06Q 10/1093 (2023.01)

(52) U.S. Cl.
CPC ................. *G06Q 10/1095* (2013.01)

(58) Field of Classification Search
CPC ............ G06Q 10/1095; G06Q 10/1093
USPC .............................. 705/7.18, 7.19
See application file for complete search history.

(56) References Cited

U.S. PATENT DOCUMENTS

| 2008/0114809 | A1 | 5/2008 | MacBeth et al. |
| 2010/0257015 | A1 | 10/2010 | Molander |
| 2010/0268566 | A1* | 10/2010 | Maresh ............. G06Q 10/1095 715/764 |

(Continued)

OTHER PUBLICATIONS

Fudickar, et al., Kopal Appointment User-Interface: An Evaluation With Elderly, Proceedings of the 4th International Conference on PErvasive Technologies Related to Assistive Environments (May 25, 2011) (Year: 2011).*

(Continued)

*Primary Examiner* — Charles Guiliano
(74) *Attorney, Agent, or Firm* — DLA PIPER LLP (US)

(57) ABSTRACT

In one embodiment, a scheduling system includes an interactive graphical user interface. Each cell has a position in a displayed first array of cells and has respective scheduling data associated with it. Each cell is visually translocatable out of the first array under a user navigation to another position within the interface. A second array of cells is displayed within the interface and some cells in the second array correspond to open time slots in a schedule. A scheduling module in the system is configured to receive a user selection of a first cell in the first array of cells, identify, based on at least some of the scheduling data associated with the selected first cell, a matching open time slot in the second array of cells, control a visual translocation of the first cell from its position in the first array of cells to the matching open time slot position in the second array of cells, and associate or transfer at least some of the scheduling data associated with the first cell to the open time slot position in the second array of cells.

17 Claims, 22 Drawing Sheets

(56) References Cited

U.S. PATENT DOCUMENTS

2013/0103444 A1* 4/2013 Agarwal .......... G06Q 10/06312
   705/7.14
2014/0229217 A1 8/2014 Bernier et al.
2015/0286979 A1* 10/2015 Ming ............. G06Q 10/063112
   705/7.14
2015/0356250 A1 12/2015 Polimeni

OTHER PUBLICATIONS

Fudickar, et al., "Kopal appointment user-interface: an evaluation with elderly", Proceedings of the 4th International Conference on PErvasive Technologies Related to Assistive Environments, May 25, 2011.

* cited by examiner

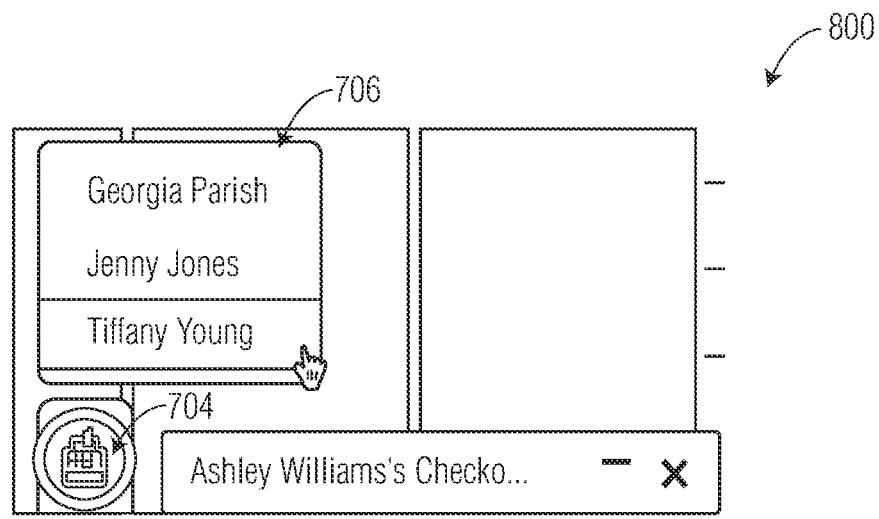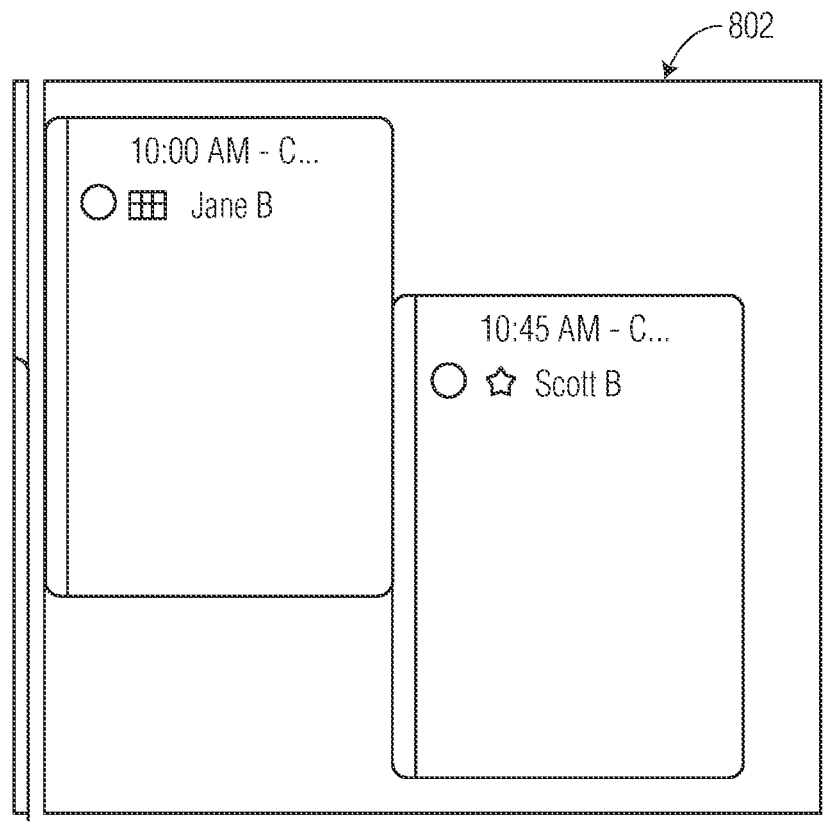
FIG. 8

Today's Services

Pricing Options

✎ Partial highlight with Shauna Evans
    Discount – Membership 10%
    Commission – Shauna Evans Single Session – Partial highlight    75.00 🗑
    – $7.50

⊕ Add a service

1802

| Partial highlight ⌄ | Shauna Evans | 5 Pack – Partial high ⊗ | $ | 50.00 |

| Hair | |
|---|---|
| 5 Pack – Partial highlight | ~~$150.00~~ $145.00 |
| 10 Pack – Partial highlight | $280.00 |
| Cancellation fee | $30.00 |
| Single – Partial highlight | $50.00 |

1804

| Full color ⌄ | Shauna Evans ⌄ | 5 Pack – Partial highli... ⌄ | $ 50.00 🗑 |

Discount

| Membership | | 10 % | – $ 5.00 |

Commission ✱

| Shauna Evans ⌄ | ✱ Required | OK |

⊕ Add a service

1806

📅 Don't forget to book Kelly's next appointment.    [ Prebook ]

Shauna Evans | $ | 0.00

⊕ Add a tip

1902

Commission ⁎
Shauna Evans

1904

Discount
Membership | 10 % | - $ 5.00

```
                                                           ┌─ 2200
    ┌─────────────────────────────────────────────┐       ↙
    │  PROVIDING AN INTERACTIVE GRAPHICAL USER INTERFACE  │
    │                      2202                            │
    └─────────────────────────────────────────────┘

┌──────────────────────────────────────────────────────────────┐
    │  DISPLAYING A FIRST ARRAY OF CELLS WITHIN THE INTERFACE, EACH CELL HAVING A
    │  POSITION IN THE FIRST ARRAY OF CELLS, EACH CELL HAVING RESPECTIVE
    │  SCHEDULING DATA ASSOCIATED WITH IT, AND EACH CELL BEING VISUALLY
    │  TRANSLOCATABLE OUT OF THE FIRST ARRAY UNDER USER NAVIGATION TO ANOTHER
    │  POSITION WITHIN THE INTERFACE 2204
    └──────────────────────────────────────────────────────────────┘

┌──────────────────────────────────────────────────────────────┐
    │  DISPLAYING A SECOND ARRAY OF CELLS WITHIN THE INTERFACE, SOME CELLS IN THE SECOND
    │  ARRAY CORRESPONDING TO OPEN TIME SLOTS IN A SCHEDULE 2206
    └──────────────────────────────────────────────────────────────┘

┌──────────────────────────────────────────────────────────────┐
    │  RECEIVING A USER SELECTION OF A FIRST CELL IN THE FIRST ARRAY OF CELLS
    │                              2208
    └──────────────────────────────────────────────────────────────┘

┌──────────────────────────────────────────────────────────────┐
    │  IDENTIFYING, BASED ON AT LEAST SOME OF THE SCHEDULING DATA ASSOCIATED WITH THE
    │  SELECTED FIRST CELL, A MATCHING OPEN TIME SLOT IN THE SECOND ARRAY OF CELLS
    │                              2210
    └──────────────────────────────────────────────────────────────┘

┌──────────────────────────────────────────────────────────────┐
    │  CONTROLLING, UNDER A USER NAVIGATION, A VISUAL TRANSLOCATION OF THE FIRST CELL
    │  FROM ITS POSITION IN THE FIRST ARRAY OF CELLS TO THE MATCHING OPEN TIME SLOT
    │  POSITION IN THE SECOND ARRAY OF CELLS 2212
    └──────────────────────────────────────────────────────────────┘

┌──────────────────────────────────────────────────────────────┐
    │  ASSOCIATING OR TRANSFERRING AT LEAST SOME OF THE SCHEDULING DATA ASSOCIATED WITH
    │  THE FIRST CELL TO THE OPEN TIME SLOT POSITION IN THE SECOND ARRAY OF CELLS 2214
    └──────────────────────────────────────────────────────────────┘

┌──────────────────────────────────────────────────────────────┐
    │  STORING IN A DATABASE THE SCHEDULING DATA IN ASSOCIATION WITH THE FIRST CELL IN
    │  THE FIRST AND SECOND ARRAYS OF CELLS 2216
    └──────────────────────────────────────────────────────────────┘
```

FIG. 22

SCHEDULING SYSTEM AND USER INTERFACES

CROSS-REFERENCE TO RELATED APPLICATION

This application is a continuation of U.S. application Ser. No. 15/043,256, filed Feb. 12, 2016, which claims priority to U.S. Provisional Application No. 62/116,087, filed Feb. 13, 2015, which are incorporated by reference in their entireties.

BACKGROUND

Empowering users to be active participants in their own health or wellness can increase user satisfaction and the quality of the health experience while decreasing the cost of providing that care. Technical problems such as non-intuitive user interfaces, user complexity and other technical difficulties in being able to cross-communicate and schedule services across a wide range of different providers, platforms, technologies and even time zones has proven a barrier to entry to many users seeking to improve their health or wellness.

BRIEF DESCRIPTION OF THE DRAWINGS

To easily identify the discussion of any particular element or act, the most significant digit or digits in a reference number refer to the figure number in which that element is first introduced.

FIGS. 4-21 illustrate aspects of graphical user interfaces for a scheduling system in accordance with various embodiments.

FIG. 22 is a flow chart of a scheduling process according to an example embodiment.

DETAILED DESCRIPTION

Glossary

Figure 1:
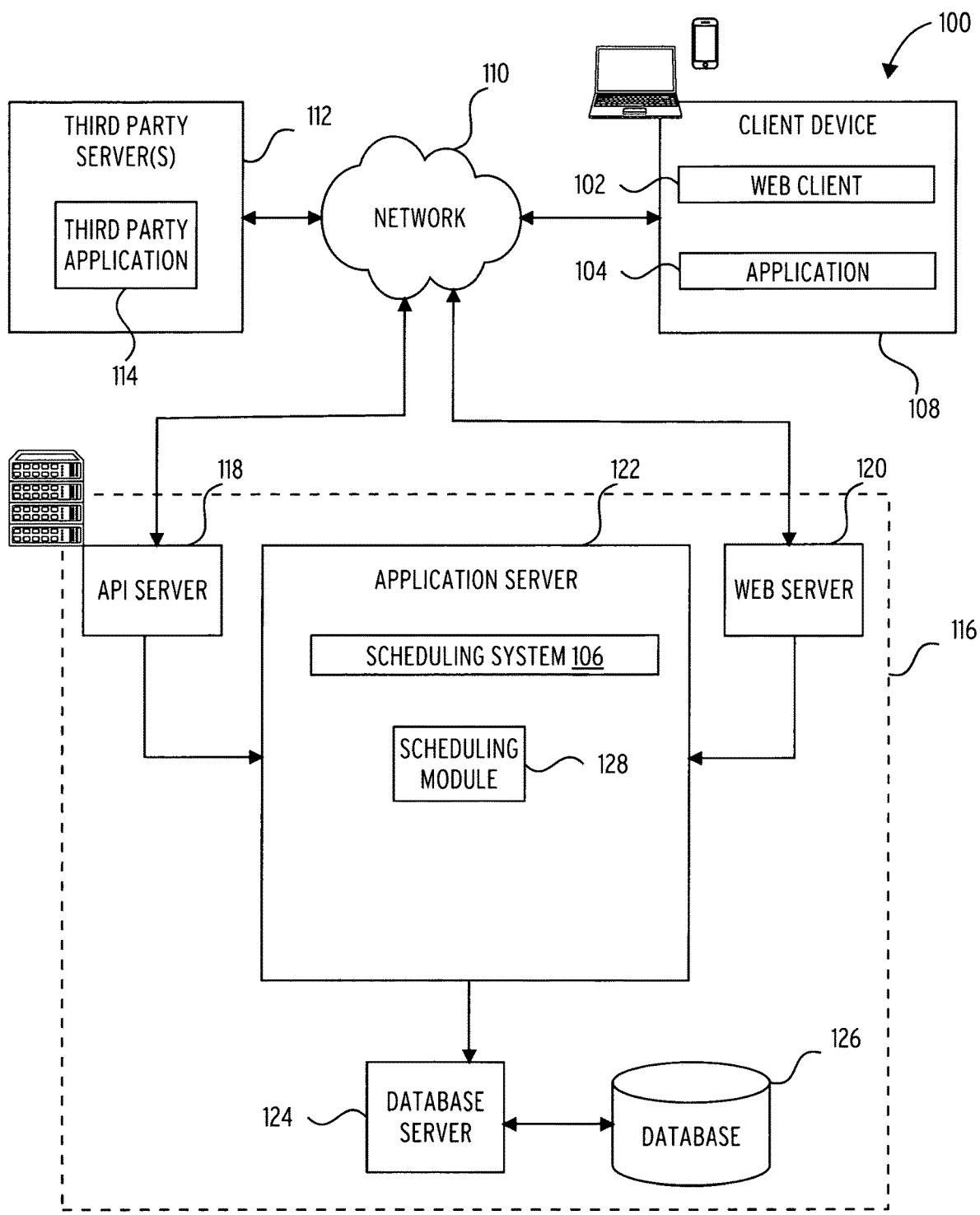
FIG. 1 is a block diagram illustrating a networked system, according to some example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultrabooks, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. ?A processor ma, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

DESCRIPTION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2015, MINDBODY, INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As part of a technical solution to the problems mentioned in the background above, the inventors have found that user satisfaction can be dramatically improved by providing greater control and easier access for the patient to request and schedule appointments for medical care and wellness services. Allowing greater control and facilitating the selection of health or wellness service providers by employers can allow an employer to provide employee incentives and reduce costs. Mutual benefits can thus include increased participation by employees in taking care of their own health and wellness, while reducing medical costs for employers and lowering related health insurance premiums.

Prebooking, or booking ahead, is a retention practice that can help a user to develop a loyal client base, build business accounts, and ensure future revenue. Prebooking is also a convenient feature for other users such as consumers and employees as it allows them to secure availability and secure a future appointment without worrying about having to book it later.

In one aspect of the present subject matter, a scheduling system 106 (or tool) is provided in this regard to address the noted problems. In some examples, the scheduling tool includes highly interactive graphical user interfaces (GUI's) such as those shown in FIGS. 4-21.

DRAWINGS

With reference to FIG. 1, an example embodiment of a high-level SaaS network architecture 100 for a scheduling system 106 is shown. A networked system 116 provides server-side functionality via a network 110 (e.g., the Internet or wide area network (WAN)) to a client device 108. A web client 102 and a programmatic client, in the example form of an application 104 are hosted and execute on the client device 108. The networked system 116 includes and application server 122, which in turn hosts a scheduling system 106 that provides a number of functions and services to the application 104 that accesses the networked system 116. The application 104 also provides a number of interfaces described herein, which present output of the tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program interface (API) server 118 and a web server 120 are coupled to, and provide programmatic and web interfaces respectively, to the application server 122. The application server 122 hosts a scheduling system 106, which includes modules or applications. The application server 122 is, in turn, shown to be coupled to a database server 124 that facilitates access to information storage repositories (e.g., a database 126). In an example embodiment, the database 126 includes storage devices that store information accessed and generated by the scheduling system 106.

Additionally, a third party application 114, executing on a third party server 112, is shown as having programmatic access to the networked system 116 via the programmatic interface provided by the Application Program interface (API) server 118. For example, the third party application 114, using information retrieved from the networked system 116, may support one or more features or functions on a website hosted by the third party.

Turning now specifically to the applications hosted by the client device 108, the web client 102 may access the various systems (e.g., scheduling system 106) via the web interface supported by the web server 120. Similarly, the application 104 (e.g., an "app") accesses the various services and functions provided by the scheduling system 106 via the programmatic interface provided by the Application Program interface (API) server 118. The application 104 may, for example, be a branded scheduling "app" executing on a client device 108, such as an iOS or Android OS application to enable user to access and input data on the networked system 116 in an off-line manner, and to perform batch-mode communications between the programmatic client application 104 and the networked system networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The scheduling system 106 could also be implemented as a standalone software program, which do not necessarily have networking capabilities.

Figure 2:
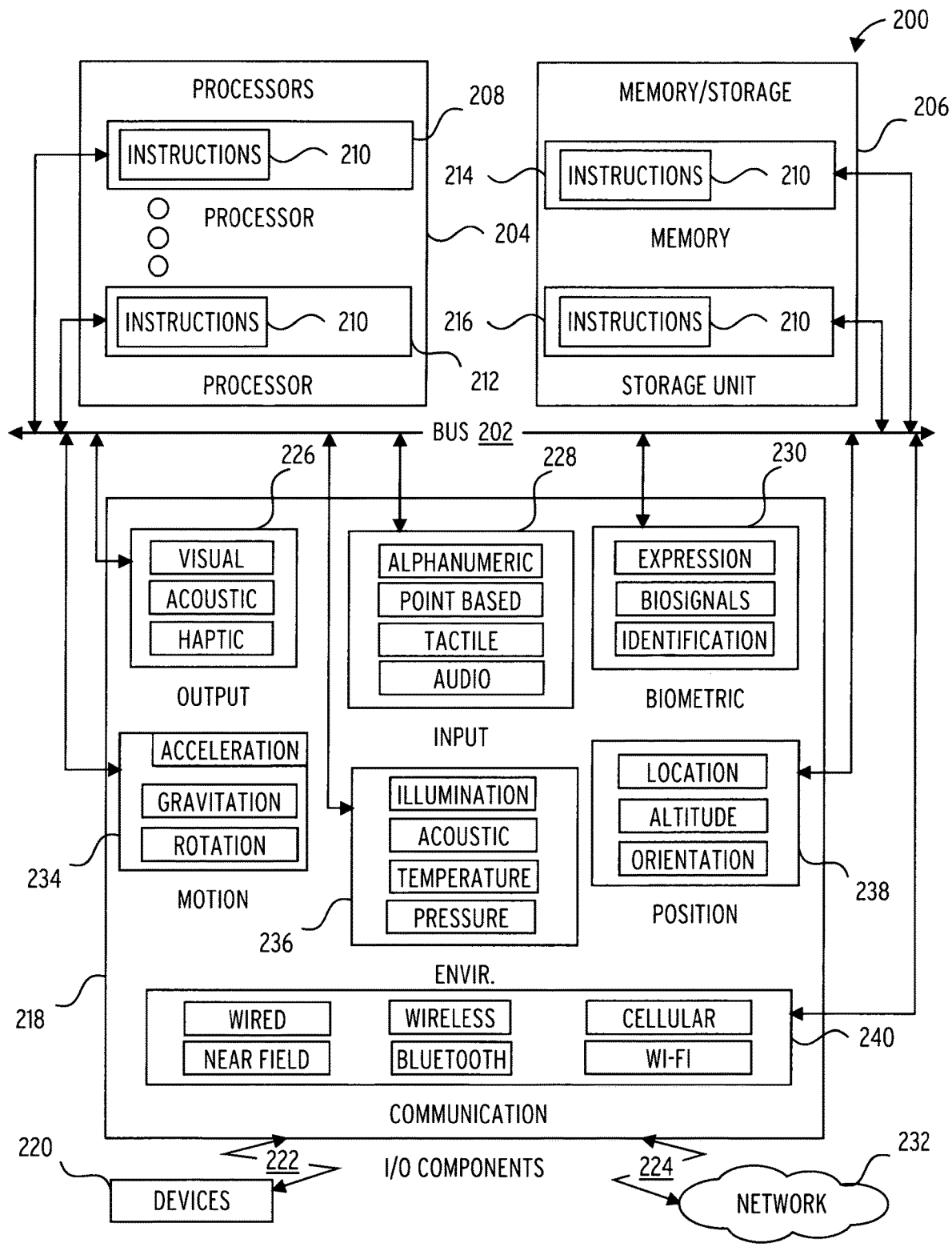
FIG. 2 is a block diagram illustrating components of a machine, according to some example embodiments, able to read instructions from a machine-readable medium (e.g., a machine-readable storage medium) and perform any one or more of the methodologies discussed herein.

FIG. 2 is a block diagram illustrating components of a machine 200, according to some example embodiments, able to read instructions from a machine-readable medium (e.g., a machine-readable storage medium) and perform any one or more of the methodologies discussed herein. Specifically, FIG. 2 shows a diagrammatic representation of the machine 200 in the example form of a computer system, within which instructions 210 (e.g., software, a program, an application, an applet, an app, or other executable code) for causing the machine 200 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 200 operates as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 210, sequentially or otherwise, that specify actions to be taken by machine 200. Further, while only a single machine 200 is illustrated, the term "machine" shall also be taken to include a collection of machines that individually or jointly execute the instructions 210 to perform any one or more of the methodologies discussed herein.

The machine 200 may include processors 204, memory memory/storage 206, and I/O components 218, which may be configured to communicate with each other such as via a bus 202. The memory/storage 206 may include a memory 214, such as a main memory, or other memory storage, and a storage unit 216, both accessible to the processors 204 such as via the bus 202. The storage unit 216 and memory 214 store the instructions 210 embodying any one or more of the methodologies or functions described herein. The instructions 210 may also reside, completely or partially, within the memory 214, within the storage unit 216, within at least one of the processors 204 (e.g., within the processor's cache memory), or any suitable combination thereof, during execution thereof by the machine 200. Accordingly, the memory 214, the storage unit 216, and the memory of processors 204 are examples of machine-readable media.

The I/O components 218 may include a wide variety of components to receive input, provide output, produce output, transmit information, exchange information, capture measurements, and so on. The specific I/O components 218 that are included in a particular machine will depend on the type of machine. For example, portable machines such as mobile phones will likely include a touch input device or other such input mechanisms, while a headless server machine will likely not include such a touch input device. It will be appreciated that the I/O components 218 may include many other components that are not shown in FIG. 2. The I/O components 218 are grouped according to functionality merely for simplifying the following discussion and the grouping is in no way limiting. In various example embodiments, the I/O components 218 may include output components output components 226 and input components 228. The output components 226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 218 may include biometric components 230, motion components 234, environmental environment components 236, or position components 238 among a wide array of other components. For example, the biometric components 230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 234 may include acceleration sensor components (e.g., accelerometer), gravitation sensor components, rotation sensor components (e.g., gyroscope), and so forth. The environment components 236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 238 may include location sensor components (e.g., a Global position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 218 may include communication components 240 operable to couple the machine 200 to a network 232 or devices 220 via coupling 222 and coupling 224 respectively. For example, the communication components 240 may include a network interface component or other suitable device to interface with the network 232. In further examples, communication components 240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 220 may be another machine or any of a wide variety of peripheral devices (e.g., a peripheral device coupled via a Universal Serial Bus (USB)).

Moreover, the communication components 240 may detect identifiers or include components operable to detect identifiers. For example, the communication components processors communication components 240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 240, such as, location via Internet Protocol (IP) geo-location, location via Wi-Fi® signal triangulation, location via detecting a NFC beacon signal that may indicate a particular location, and so forth.

Figure 3:
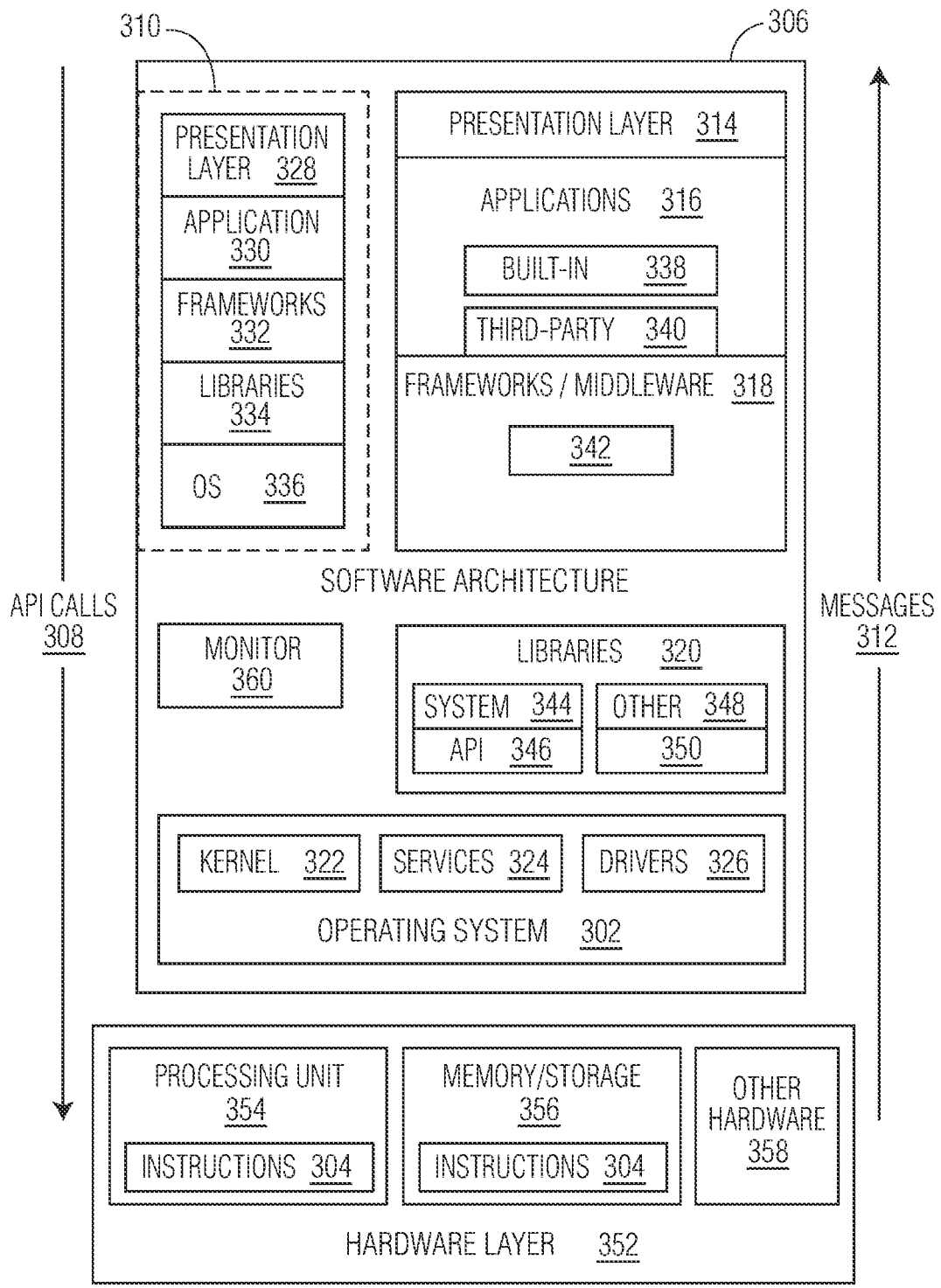
FIG. 3 is a block diagram illustrating a representative software architecture software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture and it will be appreciated that many other architectures may be implemented to facilitate the functionality described herein. The software architecture 306 may execute on hardware such as machine 200 of FIG. 2 that includes, among other things, processors 204, memory 214, and I/O components 218. A representative hardware layer 352 is illustrated and can represent, for example, the machine 200 of FIG. 2. The representative hardware layer 352 includes a processing unit 354 having associated executable instructions 304. Executable instructions 304 represent the executable instructions of the software architecture 306, including implementation of the methods, modules and so forth described herein. The hardware layer 352 also includes memory and/or storage modules memory/storage 356, which also have executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, applications 316 and a presentation layer 314. Operationally, the applications 316 and/or other components within the layers may invoke application programming interface (API) API calls 308 through the software stack and receive a response as in response to the API calls 308. The layers illustrated are representative in nature and not all software architectures have all layers. For example, some mobile or special purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324 and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than to interface directly with the underlying operating system 302 functionality (e.g., kernel 322, services 324 and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. Third-party applications 340 may include any an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 340 may invoke the API calls 308 provided by the mobile operating system (such as operating system 302) to facilitate functionality described herein.

The applications 316 may use built in operating system functions (e.g., kernel 322, services 324 and/or drivers 326), libraries 320, and frameworks/middleware 318 to create user interfaces to interact with users of the system. Alternatively, or additionally, in some systems interactions with a user may occur through a presentation layer, such as presentation layer 314. In these systems, the application/module "logic" can be separated from the aspects of the application/module that interact with a user.

Some software architectures use virtual machines. In the example of FIG. 3, this is illustrated by a virtual machine 310. The virtual machine 310 creates a software environment where applications/modules can execute as if they were executing on a hardware machine (such as the machine 200 of FIG. 2, for example). The virtual machine 310 is hosted by a host operating system (operating system (OS) 336 in FIG. 3) and typically, although not always, has a virtual machine monitor 360, which manages the operation of the virtual machine as well as the interface with the host operating system (i.e., operating system 302). A software architecture executes within the virtual machine 310 such as an operating system operating system (OS) 336, libraries 334, frameworks 332, applications 330 and/or presentation layer 328. These layers of software architecture executing within the virtual machine 310 can be the same as corresponding layers previously described or may be different.

Figure 4:
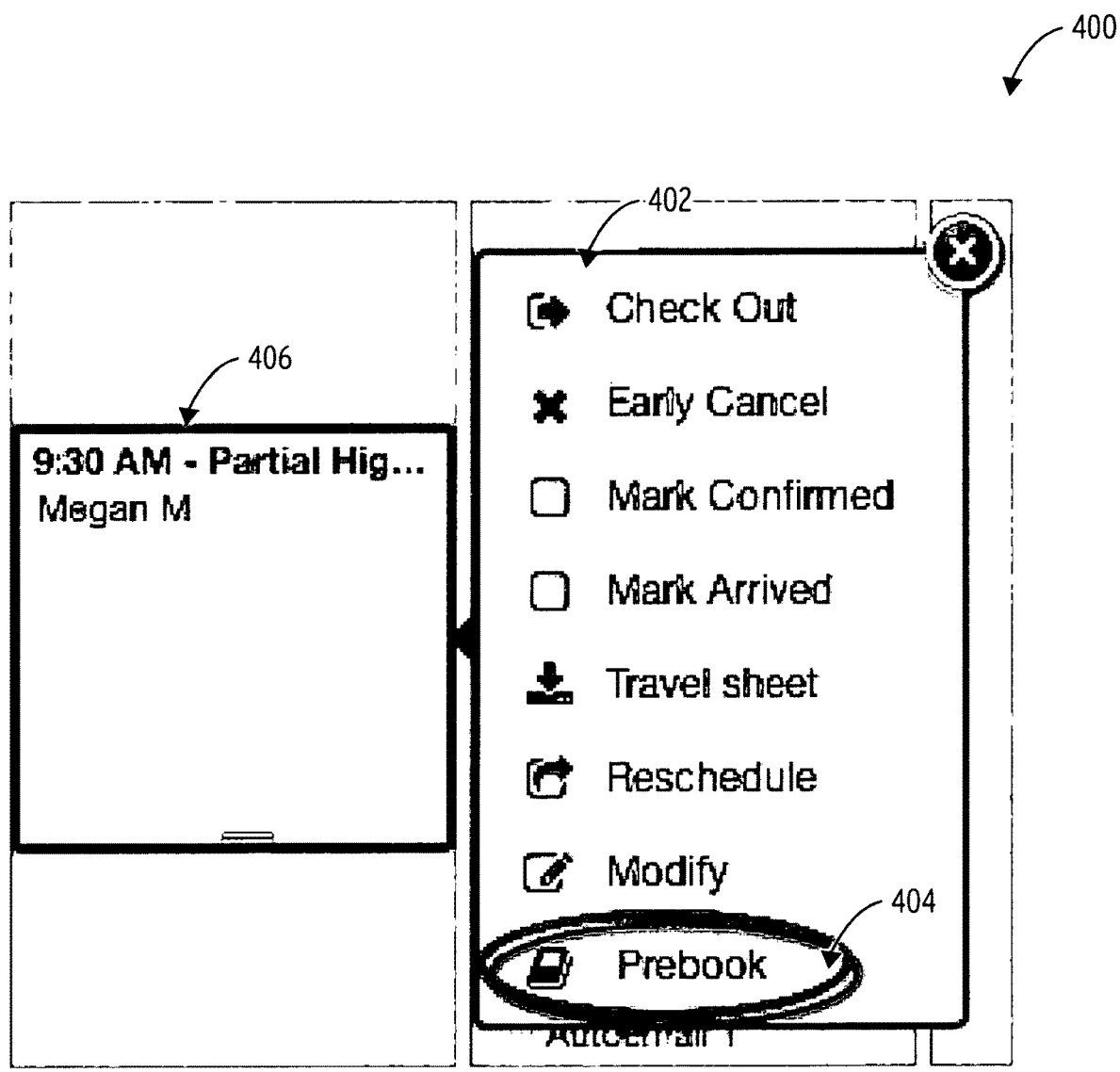

Reference is now made to FIG. 4. A portion of an example scheduling screen 400 of an interactive GUI is shown. An existing appointment in a calendar is reflected in an example display element 406. The existing appointment may have time, date, service rendered, provider and client details, and so forth. Assume the appointment is one of interest and needs to be repeated for a given client. By clicking the display element 406, a scheduling module 128 in the scheduling system 106 introduces a call to a specified user action. This call may for example be made just prior to an appointment checkout in which the user (e.g. a service provider) is prompted to prebook (repeat) the client's future appointment. Other actions (e.g. check out, and so forth) as shown are possible. The prebook (and other) functionality is provided by a pop-up menu 402 of action elements which include, inter alia, a "prebook" action element 404. In selecting the "prebook" action element 404 displayed in the checkout review screen 400, the user is launched into a prebooking operation with the selected client's information. The steps described above can be referred to and form part of a "prebook from appointment" operation which can be made at will.

Figure 5:
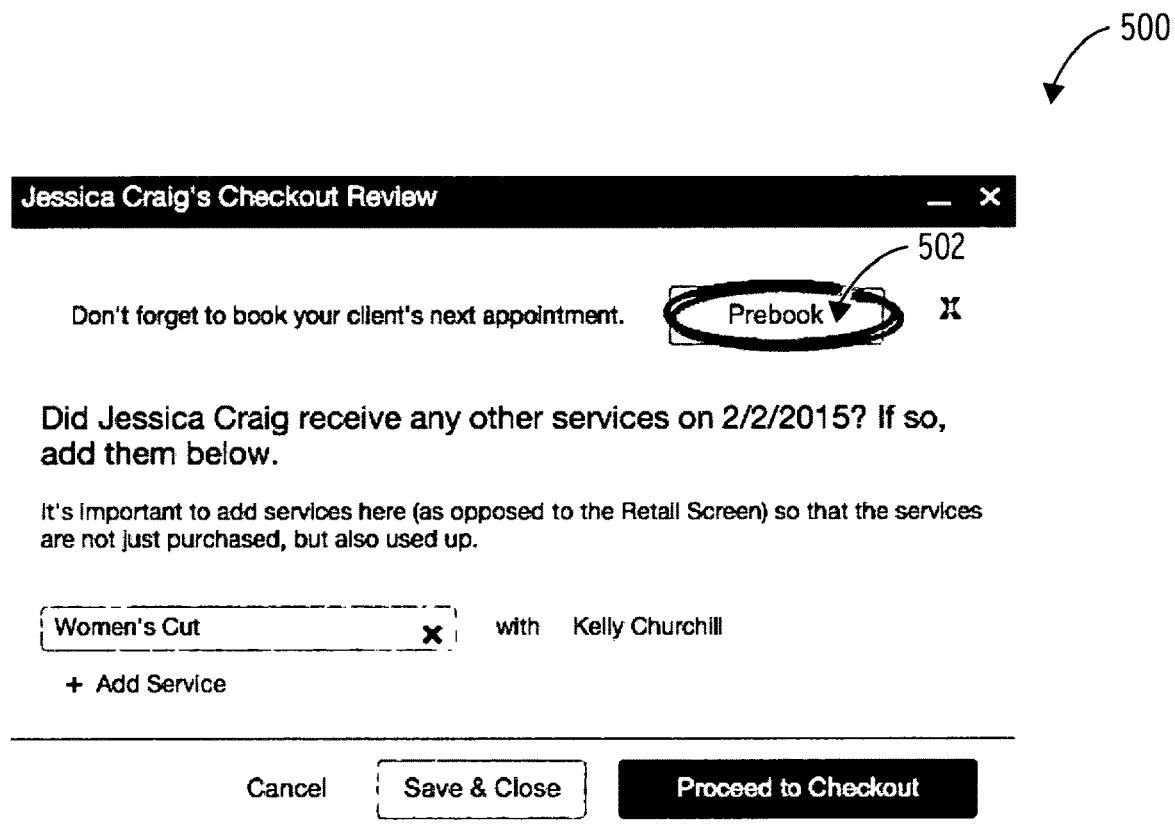

Alternatively, a "prebook from checkout" interface view 500 is given in FIG. 5. This series of steps is typically performed when a client checks out of a service and is about to pay and exit the premises. The view 500 includes various information and action elements as shown. Upon clicking the "prebook" action element 502 (or 404), the user is launched into a booking mode in which a template for a given day's services is carried over to a sidebar.

Figure 6:
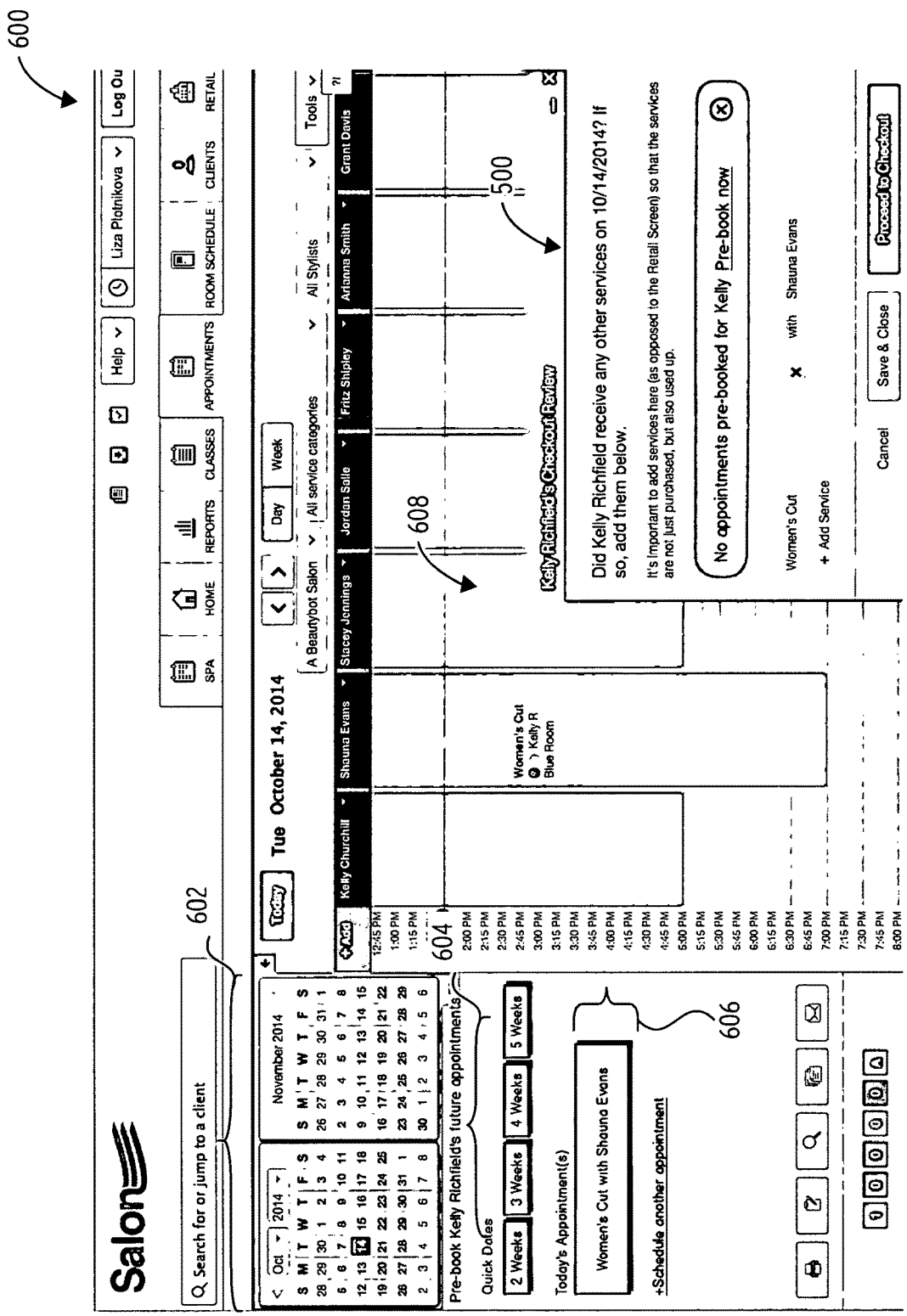

An example sidebar 602 is shown in FIG. 6. The sidebar 602 has "date jumpers" 604 that allow a user to navigate quickly over a defined time period (e.g. 4 weeks) out into the future. In a first portion 606 of the sidebar 602, the sidebar 602 pulls in and displays a given day's services for a client, for example the current day's services (as shown) so all the user has to do is click to place a "pending" appointment in a calendar shown in a second portion 608 of the screen 600 to have the details of the services entered therein, with the salient time, date, service details and so forth adjusted accordingly. The present disclosure thus provides technical solutions and a retention tool that helps to facilitate scheduling wellness and health services.

Thus, as described above, a wellness provider for example can conveniently book a client's next appointment using the described prebook functionality. The provider navigates to an appointment in schedule (e.g. 406 in FIG. 4) and clicks on it. Again with reference to FIG. 4, in the action menu 402, the wellness provider can select the prebook option 404 at the bottom of the list. In one refinement, this causes the client to "pop up" in the sidebar 602 in FIG. 6. From here, the wellness provider can quickly rebook a service that the client has received before, or simply reschedule an appointment. With reference again to FIG. 5, a wellness provider can also book a client's next visit using the appointment checkout review feature. This feature allows the wellness provider to change the service that was originally booked, and add more services to the ticket, all while staying on the appointment schedule. The wellness provider can enable the appointment checkout review feature from an appointment options screen. Once the rebook system is enabled, in order to book a client's next visit from a checkout review window, the wellness provider simply chooses an appointment on the client's schedule, selects "check out" from the action menu, and clicks the "prebook" button.

Figure 7:
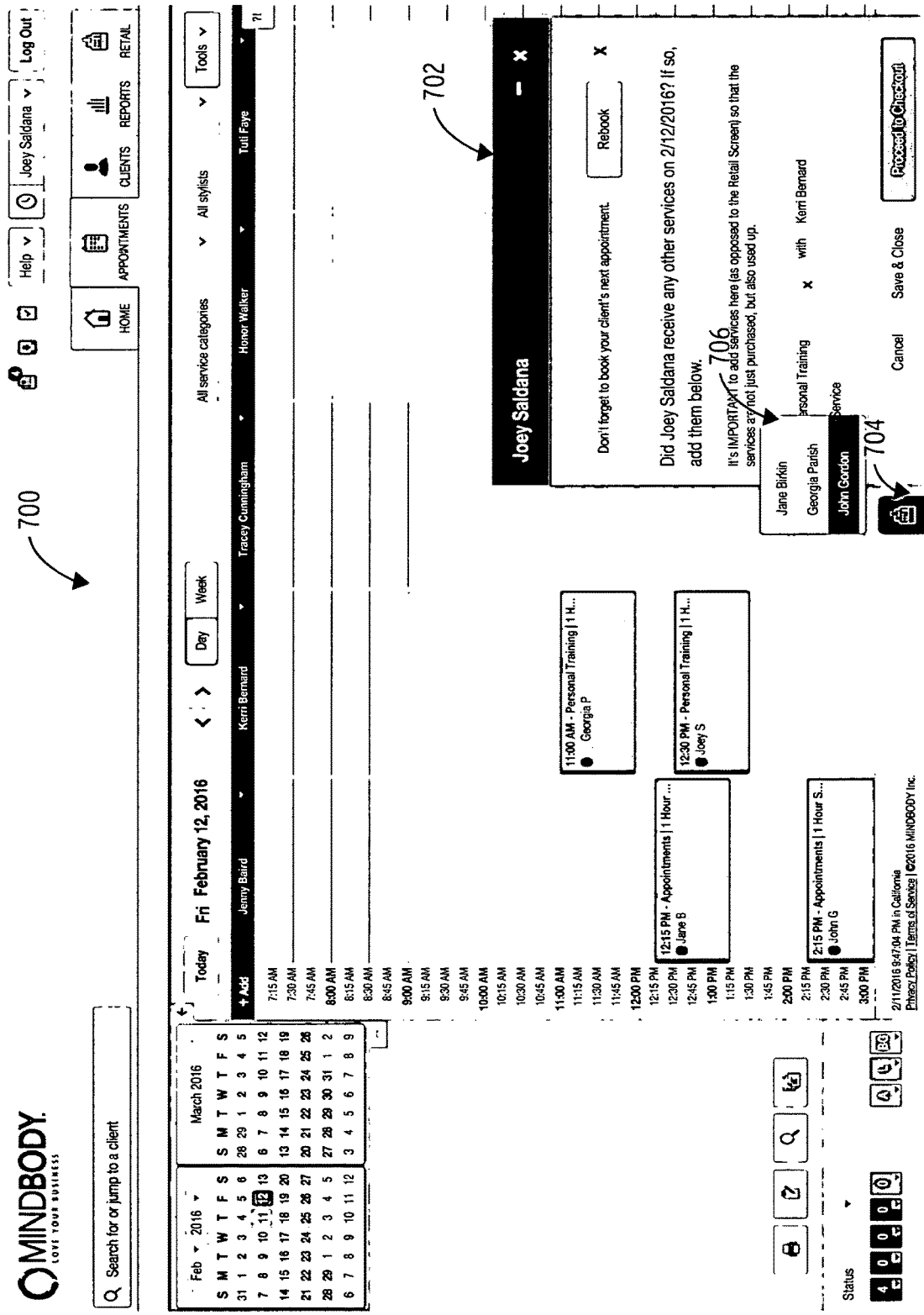

Other aspects of the scheduling system 106 include a "dock-able" checkout review that allows a user (e.g. service provider) to review a day's services, add on services while multitasking and managing multiple client checkout carts or appointment scheduling. Reference is made to FIG. 7 in this regard. An "add-on" manager 702 allows the service provider to change or add on services to a client's ticket while remaining on the appointment scheduling view 700. The add-on manager 702 also allows the wellness provider to have multiple carts open with the ability to minimize and maximize a new window and add services to any one or more of the carts for check out. In the example given in FIG. 7, an add-on manager 702 for a client Joey Saldana is shown at bottom right in the view. Several other client carts may be in the process of being checked out, or services scheduled. These other clients are stored (or "docked") in association with an overflow element 704 visible at the bottom of the interface view 700. A list of clients "stored" or queued up in the overflow element is given in a display window 706.

An expanded, or opened out, view of overflow element 704 is shown in FIG. 8. Opening the overflow element 704 by clicking on or hovering over it allows the service provider to see all minimized carts in the display window 706 (e.g. Jenny Jones, Tiffany Young etc.). The ability to manage multiple carts on the same screen without leaving the appointment schedule provides a convenient technical solution. This allows a wellness provider to start a cart for multiple clients without having to leave the appointment schedule which allows the wellness provider to carry out a checkout task on the appointment schedule, pop in and out of one or more carts, and add services as needed. Shown in view 802 are examples of prebooked and finalized appointments appearing in a schedule displayed, for example, in the second portion 608 of the view 600, or in the third portion 1006 of the interface view 1000 shown in FIG. 10.

Figure 9:
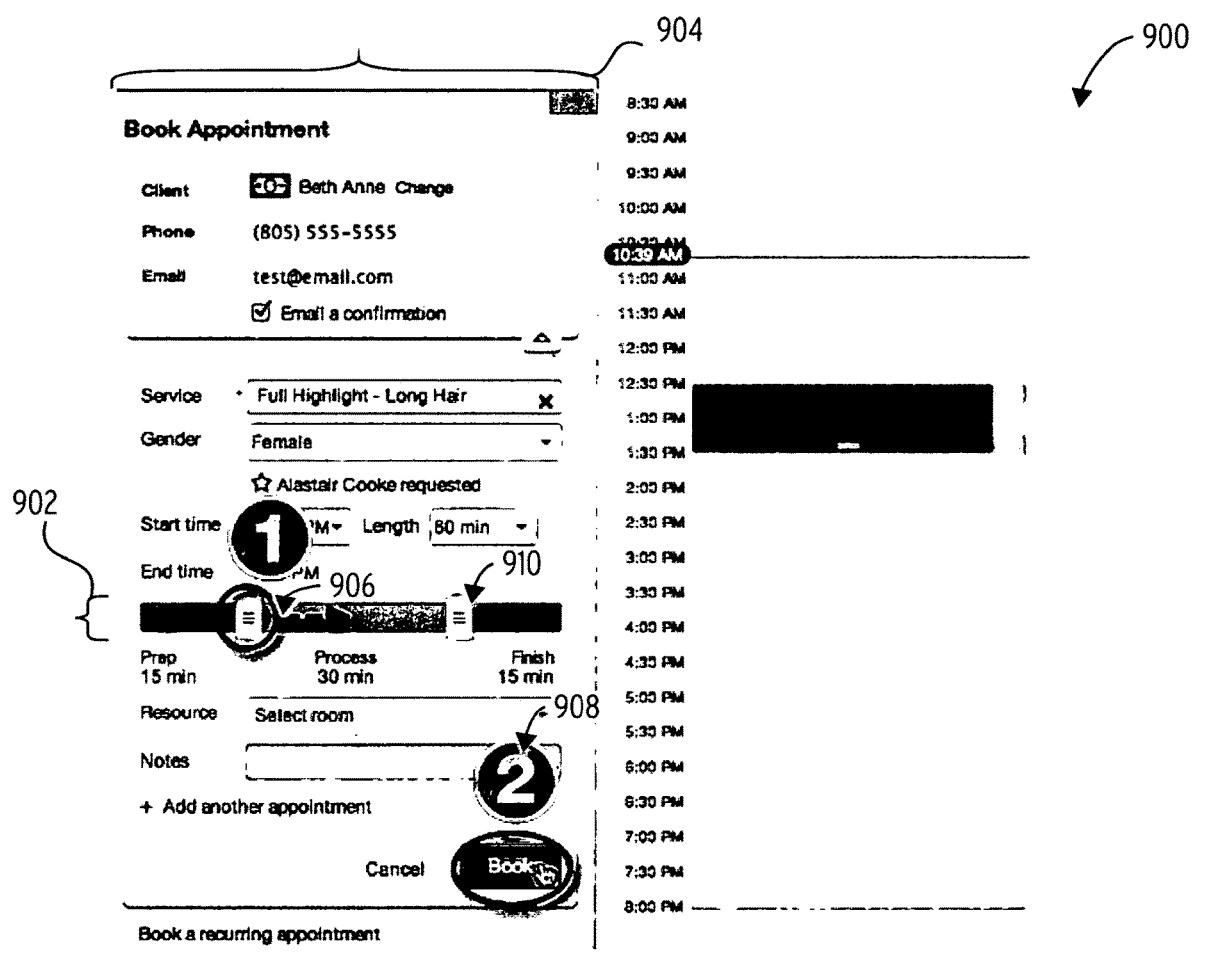

A further technical solution of the scheduling system 106 includes the ability to to modify the preparation, processing and finish time of any given appointment. Reference is made to FIG. 9 in this regard. Two sliders 902 in a sidebar 904 allow a user quickly to adjust the preparation, processing and finish time for any appointment for the purpose, for example, of avoiding double-booked or overlapping appointments. An example interface 900 which includes this functionality is given in FIG. 9. The left slider 906 can slide from left to right in the view to allow for the customized preparation, processing and start times of an appointment that can be booked at user interface element 908. Similar functionality is provided for right slider 910 for the finish times of appointments. The sliders 906 and 910 give a visual representation of preparation, process, start and finish times of an appointment and allow a user to set such times or periods by a simple dragging action.

A further technical solution provided by the scheduling system 106 includes the ability to store preparation, start and finish times per staff member, per client, and per service as a part of a feature relating to so-called "smart booking". This "smart booking" tool is made part of an interactive interface and responds interactively with existing appointments in a given schedule. For example, a stylist at a service provider may want to double book an appointment despite conflicts in preparation and finish time because the stylist knows she can squeeze a client in for a haircut, for example. The "smart booking" tool provides an alert, for example: "This appointment conflicts with an existing reservation, would you like to override?"

Figure 10:
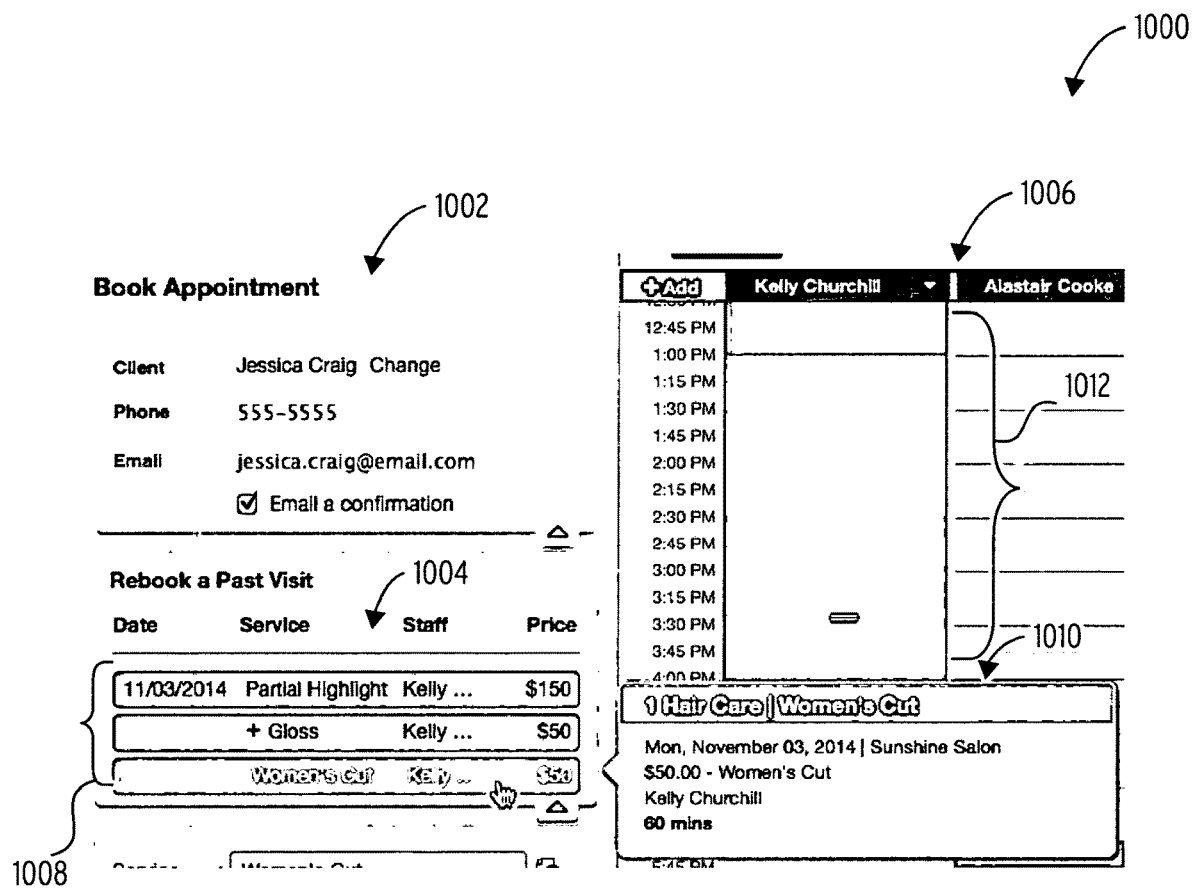

Another example of prebook functionality is now described with reference to FIGS. 10 and 11. In the interface view 1000, a first portion of the screen 1002 includes various details pertaining to a client, in this case Jessica Craig. In a second portion 1004 of the view 1000, an array 1008 of visually movable cells is provided. The array 1008 of cells may have any number of rows and columns, but in this case one column and three rows are shown.

A third portion 1006 of the interface view 1000 includes a second array 1012 of receiver cells including several columns of cells each relating to a specific date and time (e.g. 2:30 pm), appointment periods (e.g. 1 hr) and service provider (e.g. Kelly Churchill, Alastair Cooke and so forth). The second array of cells 1012 may have any number of rows and columns, but in this case two column and several rows for times of day are shown. Other data elements in addition to or instead of time of day are possible.

Each cell in the first array of cells 1008 is associated with data, for example data stored in database 126, relating to prior services (for example) received by a user such as a client at a hair salon or yoga studio. Other types of data in addition to or instead of prior services are possible. The data may include aspects such as location, time, date, service, client and provider, for example. Each cell may be associated with some, all or none of this information. The detail of such data may be rendered visible in a text balloon 1010 caused to appear by a "hovering over" navigation action, for example.

Figure 11:
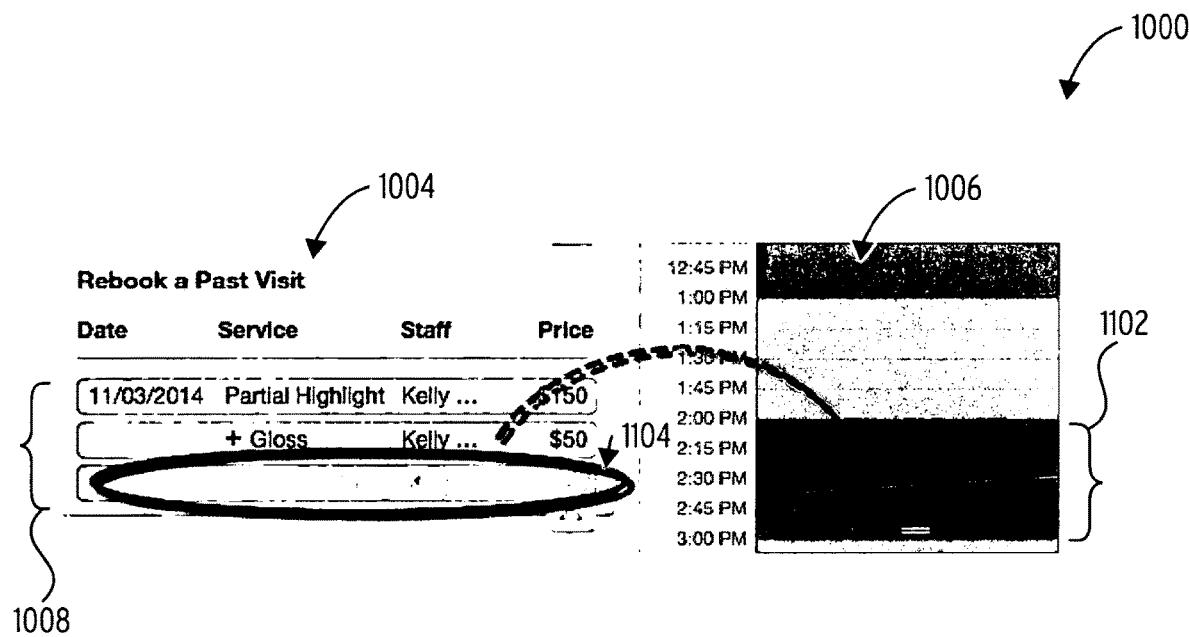

The first array 1008 of movable cells in portion 1004 of interface view 1000 is shown again in FIG. 11 juxtaposed against an area of the third portion 1006 of the view 1000. Based on at least one aspect of the data associated with a movable cell (e.g. encircled cell 1104) in the first array 1008, for example data such as length of an appointment and/or a selected service provider, one or more "receiver" cells 1102 can be identified in the second array of cells 1012 into which the movable cell can be moved by a drag and drop operation, for example. The relevant data in the movable or donor cell is received by the receiver cell. The scheduling module 128 identifies a receiving column for an identified service provider specified in the movable donor cell (in this case it is the first column for Kelly Churchill) in the second array 1012 of cells based on an identification of that service provider associated with the movable cell 1104. Assuming a one hour appointment is also associated with that movable cell 1104, a selection of non-conflicting receiver rows 1102 is designated accordingly, in the designated column for Kelly Churchill (in this case four rows of fifteen minutes each, starting at 2 pm). Thus with a single drag and drop navigation, a service provider can easily leverage existing data to prebook another appointment for a client. Other types of navigation e.g. a tap to drop, or slide based navigation on a touch screen, are possible. A technically improved GUI with enhanced functionality and interaction is thus provided.

Figure 12:
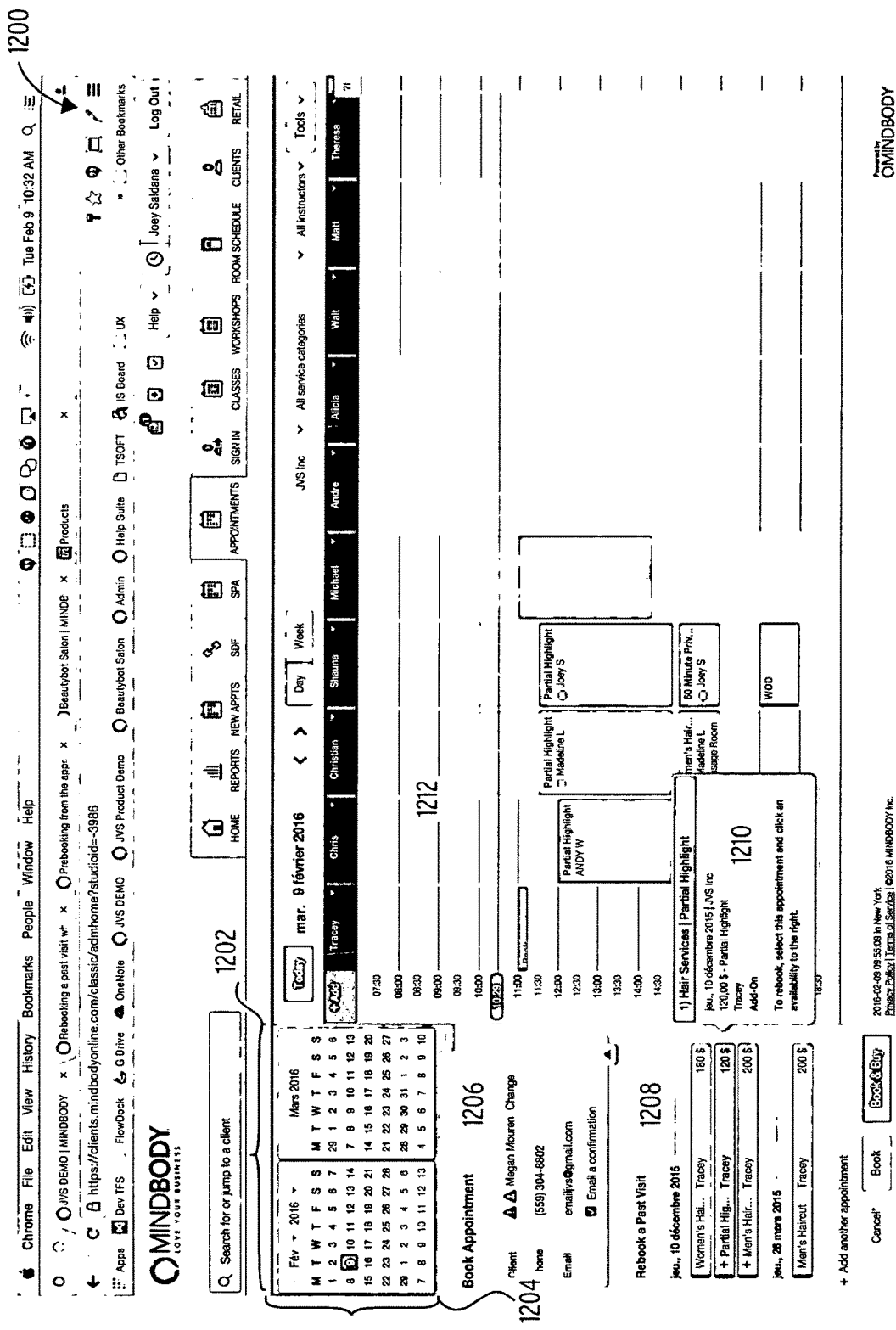

FIG. 12 shows another interface view 1200 in a scheduling system 106. The view 1200 includes is a sidebar 1202 which has a first "future month" month section 1204 displaying, in this case, February and March. A second "book appointment" section 1206 includes details of a user, e.g. a client. A third "rebook" section 1208 includes visually movable cells and text balloon 1210 both of which enjoy the functionality discussed above in relation to these types of interface elements. A fourth "scheduling" section in view 1200 is shown generally by the numeral 1212. This section includes columns, rows, and cells for various service providers, times of day, days of the week and so forth, as well as action elements as shown to select service categories, locations and the like.

A process for scheduling a user service for a user (e.g. client) is now described. This process can be referred to as a prebooking workflow. Assume that a user (e.g. wellness provider, or hair studio) wishes to book an appointment for Megan, the example client shown in section 1206. Initially, substantially the entire appointment scheduling view 1200 of the interface is visible. Megan's details can be seen in section 1206, and a record of her past visits and services (with the relevant data elements as described earlier) is displayed in section 1208 of the interface 1200.

Figure 13:
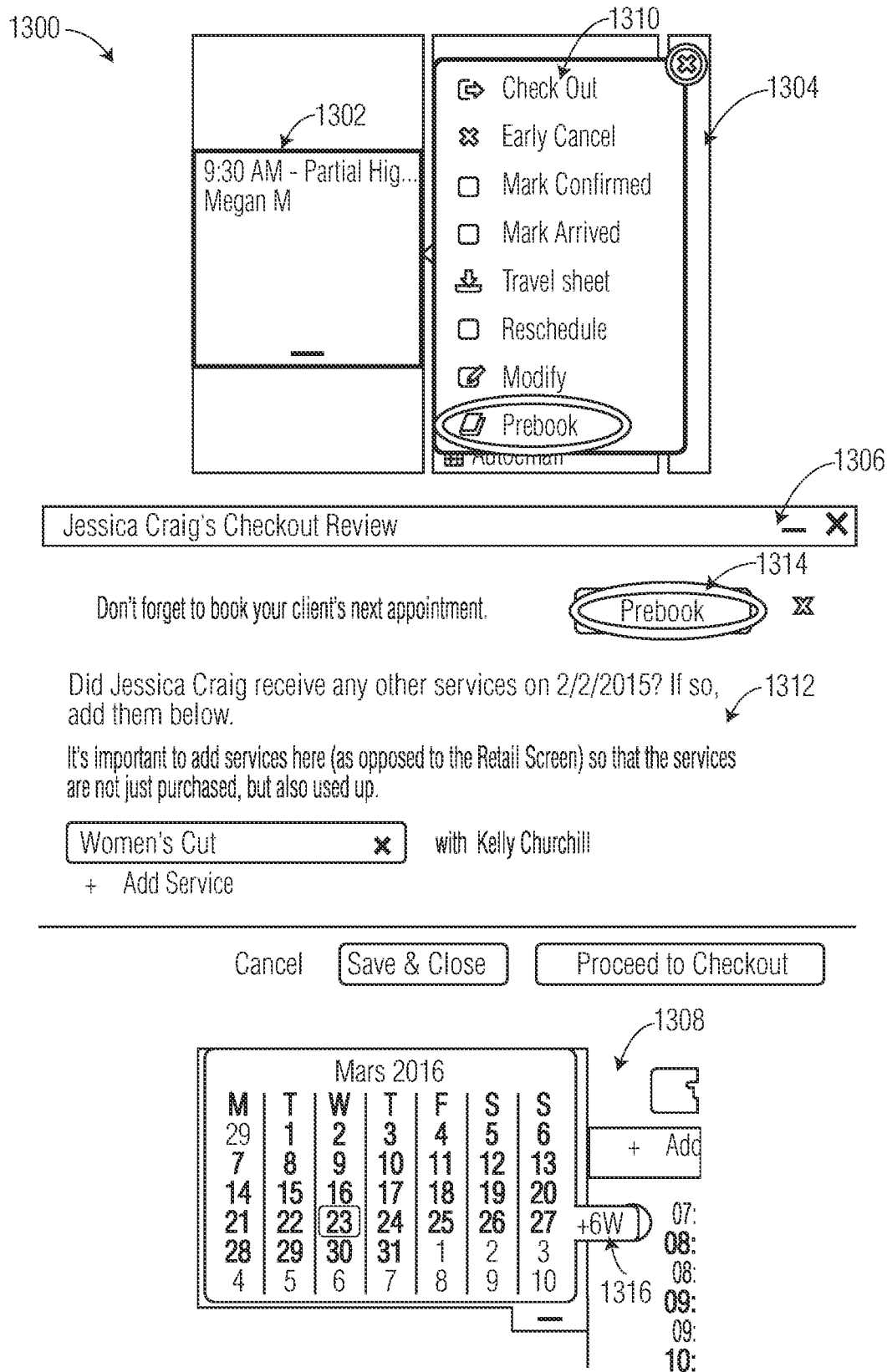
Figure 14:
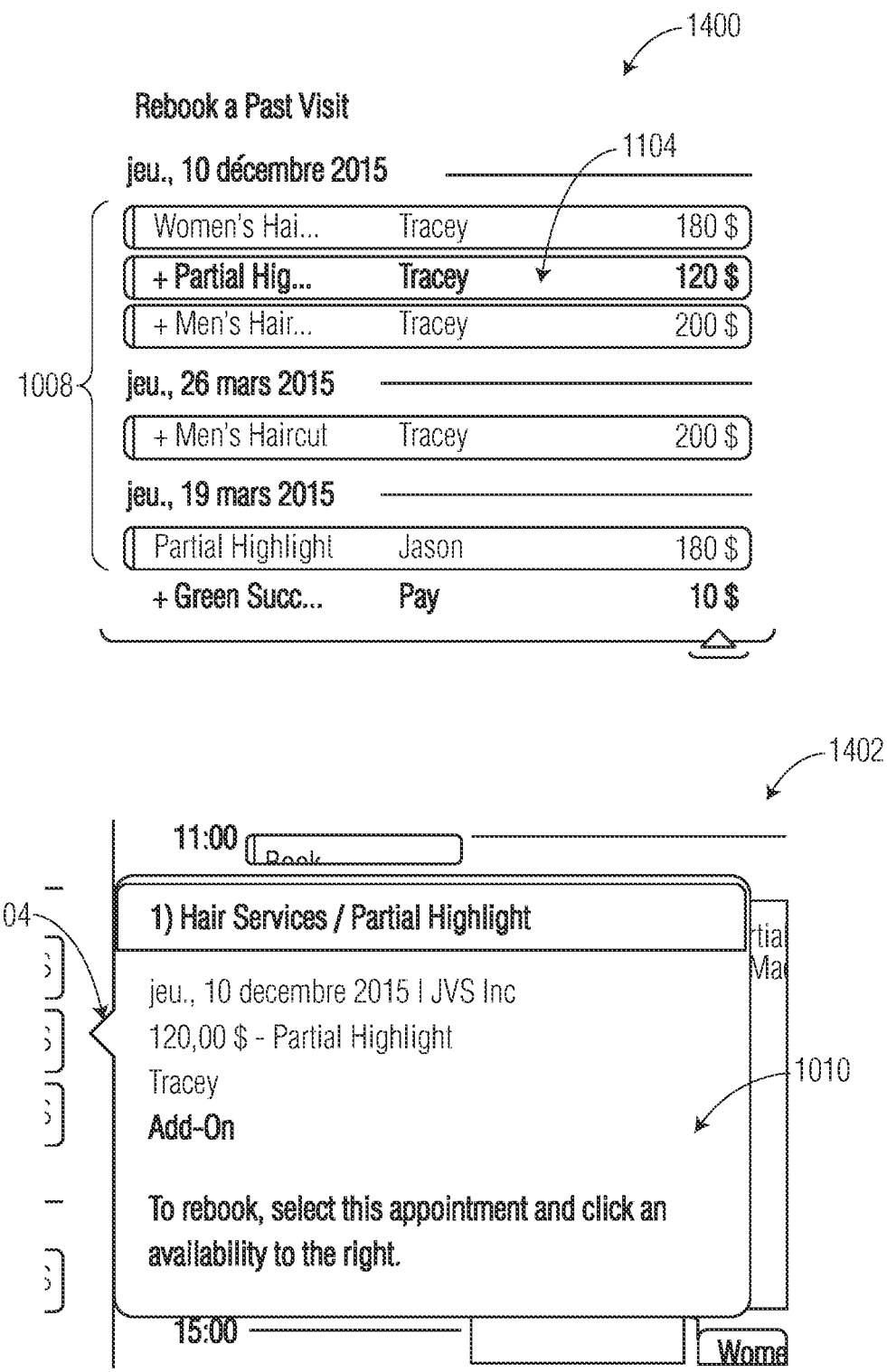

There are several ways to enter the prebooking workflow and these are discussed with reference to the views shown in FIG. 13. One way is for a user to click on or hover over an appointment window 1302 in the scheduling section 1212 of interface 1200, as shown in view 1304. The click or hover action causes a menu 1310 of action items to appear, one of which is a prebook operation.

Another way to enter the prebook operation is during a checkout process. A prebook prompt 1314 can be included in a checkout review window 1312 such as the window shown in view 1306. The content and visibility of the window 1312 is controlled by the scheduling module 128 and can be displayed during a check out process, for example. It includes a prebook action item 1314 for entering a prebook workflow. Other methods for entering the prebook workflow are possible. These are examples.

A convenient scheduling or visibility tool can be provided in the course of a prebook workflow. In view 1308 of FIG. 13, a portion of the "future month" section 1204 of sidebar 1202 is visible, in this case the view for an upcoming March (Mars 2016). Hovering over any date in that calendar view causes an indicator 1316 to appear as shown by the "+6 W" message in the view and allows a user to navigate out to a future date. The "+6 W" message indicates that a given date being hovered over or selected (e.g. greyed-out date March 23) is six weeks out into the future which can facilitate an easier navigation to or calculation of a date for a prebooked appointment.

Another way to enter the prebook workflow is to start from the third "prebook" section 1208 of interface 1200 shown in FIG. 12. This view is shown again in enlarged detail at 1400 of FIG. 14. A first array 1008 of visually movable cells with all the associated functionality described before is provided. The prebook section 1208 provides a view of services provided to one or more clients on previous occasions. One or more of these services may be required again, or "prebooked". As before, a given cell (e.g. cell 1104) can be hovered over as shown in view 1402 to see a display of more detailed information in text balloon 1010 such as prior service description, service provider, price paid and so forth at the time of the prior visit. Instructions on how to rebook one of the prior services are given.

Figure 15:
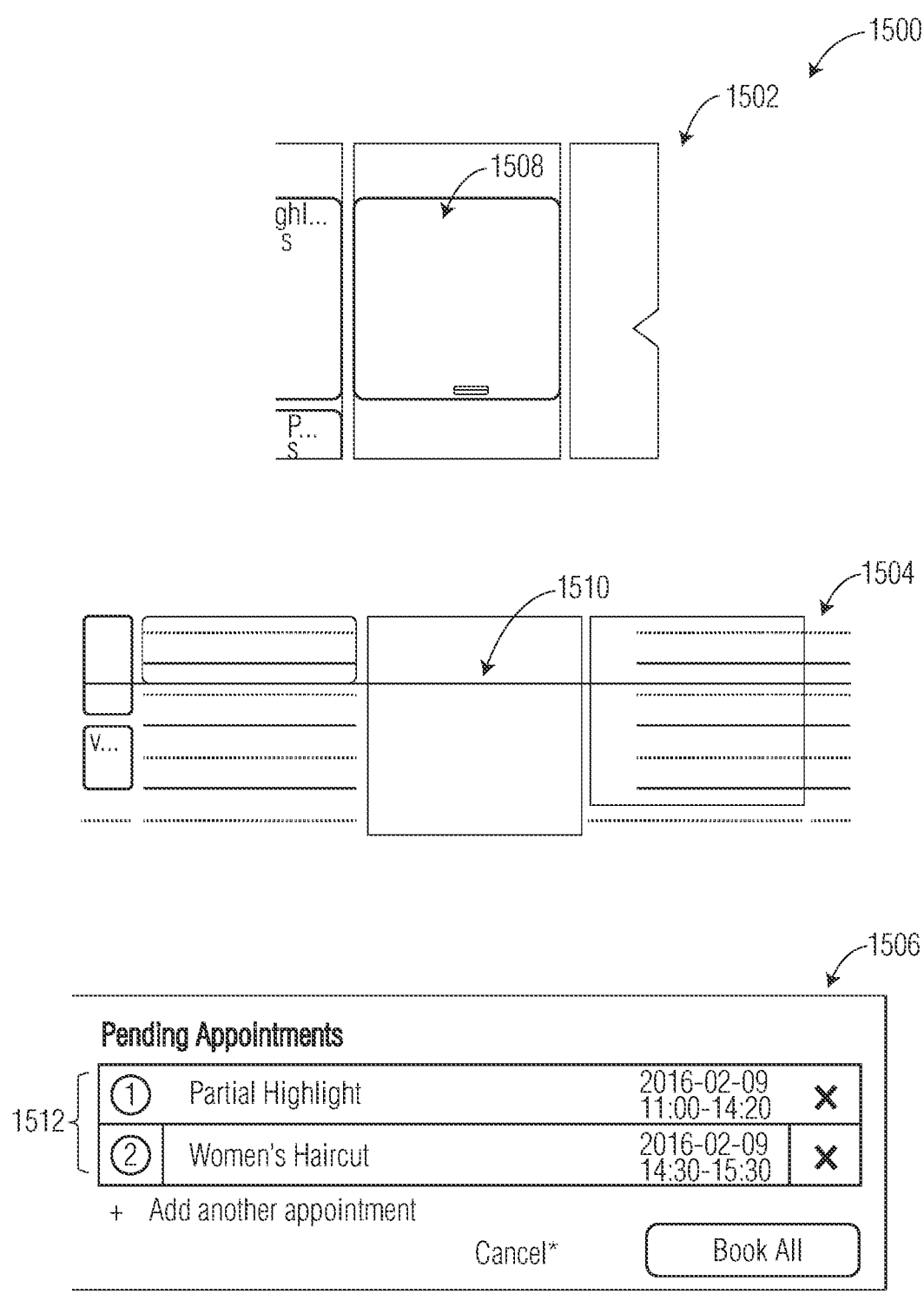

Ensuing steps are now described with reference to the views 1502, 1504, and 1506 in FIG. 15. The selection or highlighting of a cell (e.g. 1104) in the first array of cells, or in other words the selection of certain data such as a type of service, appointment duration, or service provider causes the scheduling module 128 to place a temporary marker 1508 in the relevant column and available time slot for that service provider in the "scheduling section" 1212 of interface 1200. This is shown in enlarged form in view 1502. The movable cell 1104 can be moved to this region (by drag and drop or other operation as described above) to populate the temporary region, as it were, and complete a prebooking operation. The new appointment is automatically assigned the relevant details from the "donor" appointment, changed where necessary to associate the new date and time, for example.

If multiple prior appointments are selected (i.e. several cells 1104), a line 1510 is drawn across the scheduling section 1212 of the interface 1200 as shown in view 1504 to indicate the suggested start time of one or more appointments, sequenced accordingly. In view 1506, as the user places a second appointment into the scheduling section 1212, a display element 1512 listing a queue of pending appointments also selected for prebooking is made visible by the scheduling module 128.

Figure 16:
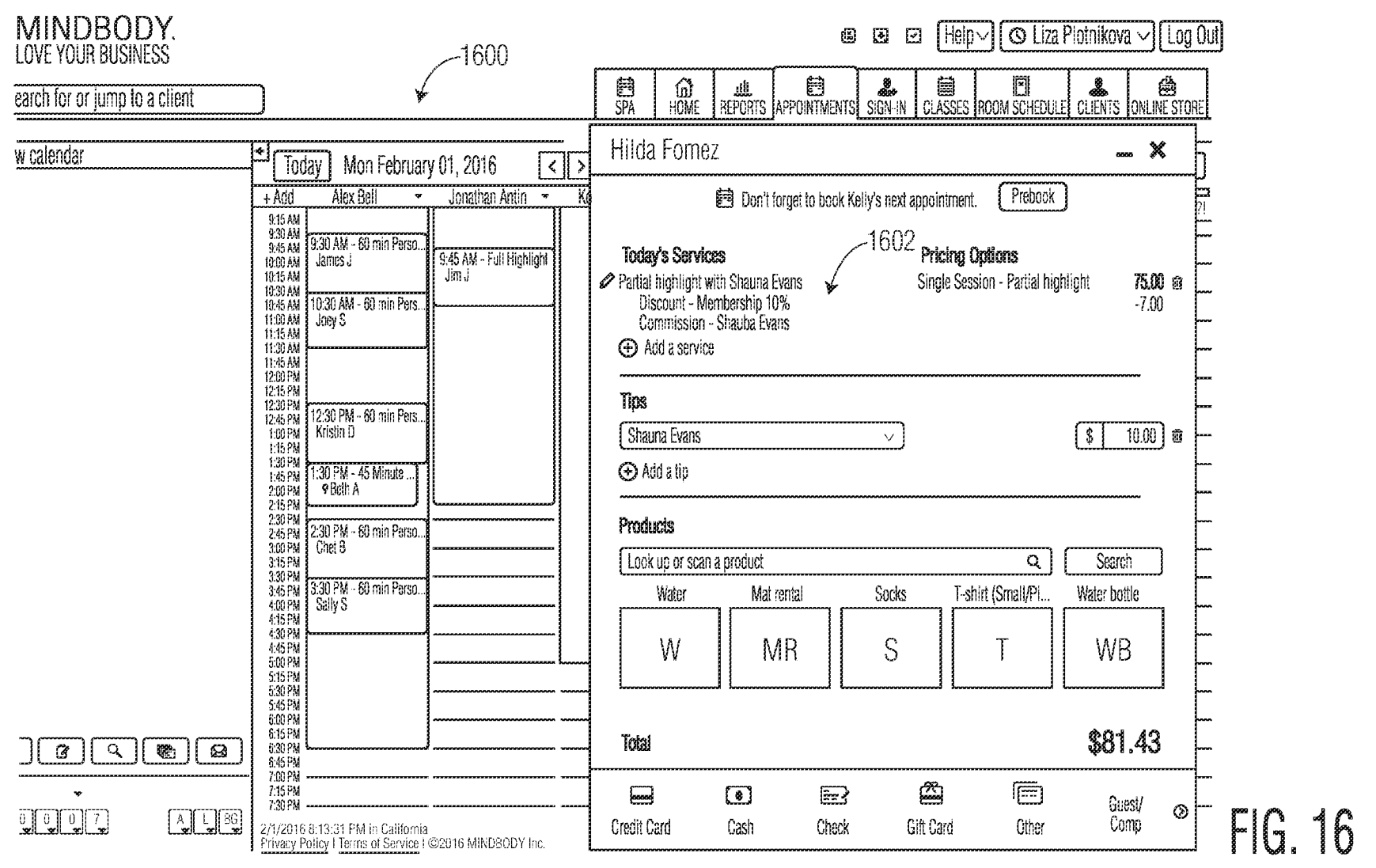

A prebooking workflow can also form part of a checkout flow. With reference to FIG. 16, interface view 1600 shows an appointment page with a configurable checkout tool 1602 open. This tool 1602 allows a user to stay in the context of an appointment schedule while checking someone out. One technical problem addressed by the inventors is that of multitasking and rendering previously hidden information visible. For example, the inventors know that checking out an appointment is not an isolated action. Front desk staff are often multitasking, updating appointments, changing prices, rebooking their next appointments, and so forth.

Figure 17:
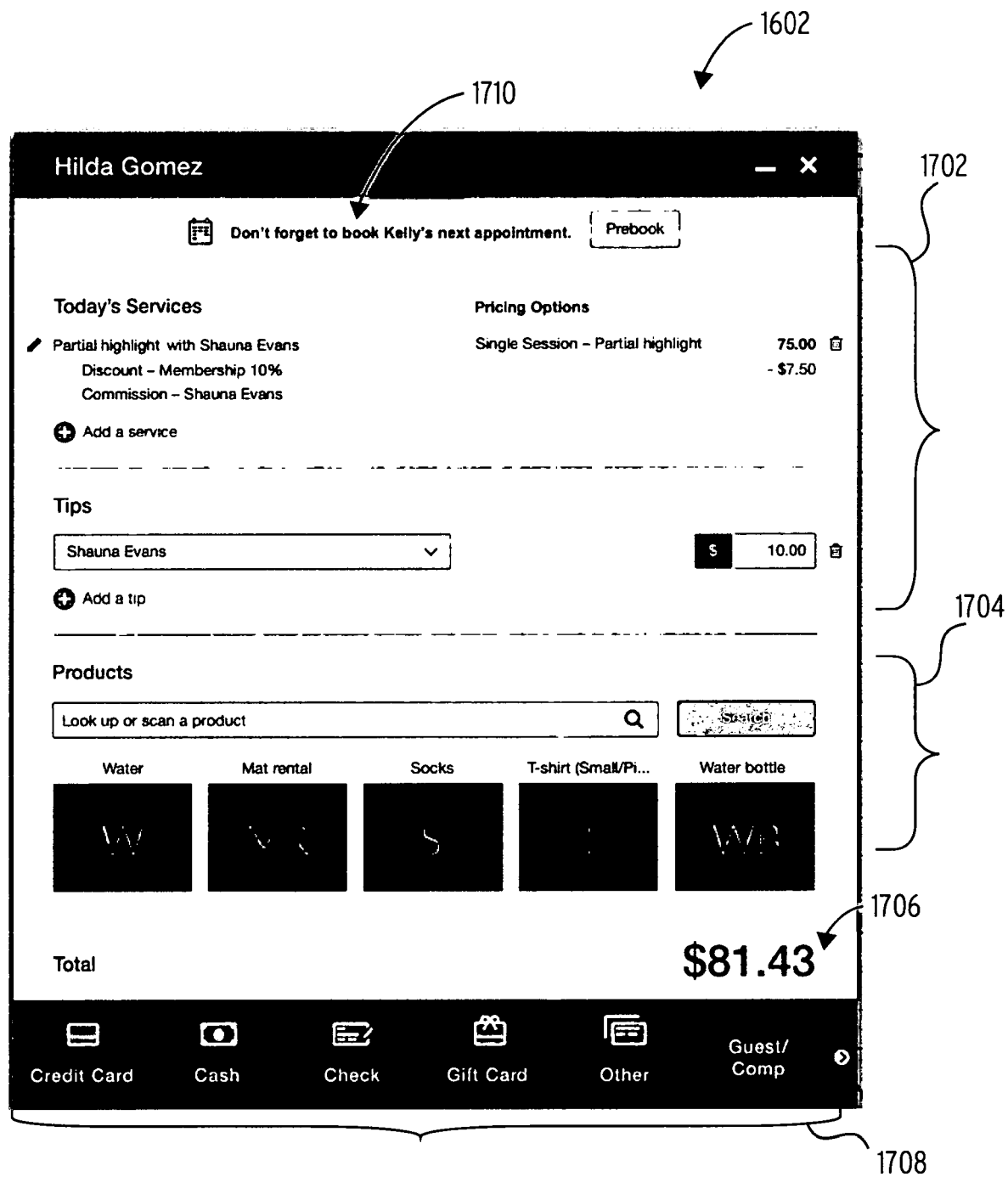

An enlarged view of the checkout tool 1602 appears in FIG. 17. A prebook action bar is provided at 1710 to launch a prebook operation as described above. Various example checkout action items such as price selection, services rendered, tip, and so forth are shown at 1702. Product selections such as water, socks, T-shirt for example are provided at 1704. A total price ($81.43) is rendered in display element 1706. Payment elements are shown at 1708.

The configurable checkout tool 1602 can be provided by the scheduling module 128 as a dockable window that lives within the appointment scheduling view. The tool 1602 is highly configurable.

With reference to FIG. 18, the tool 1602 allows the addition of items to a cart (1800), the selection of available pricing options (e.g. single session, 5 pack, 10 pack, unlimited and so forth) (1802), the addition and editing of services (1804), and prebooking a client's next appointment (1806).

With reference to FIG. 19, the tool 1602 allows the addition of tips (1900), the addition of commissions (1902), the application of discounts (1904), and the entering of pricing (1906).

Figure 20:
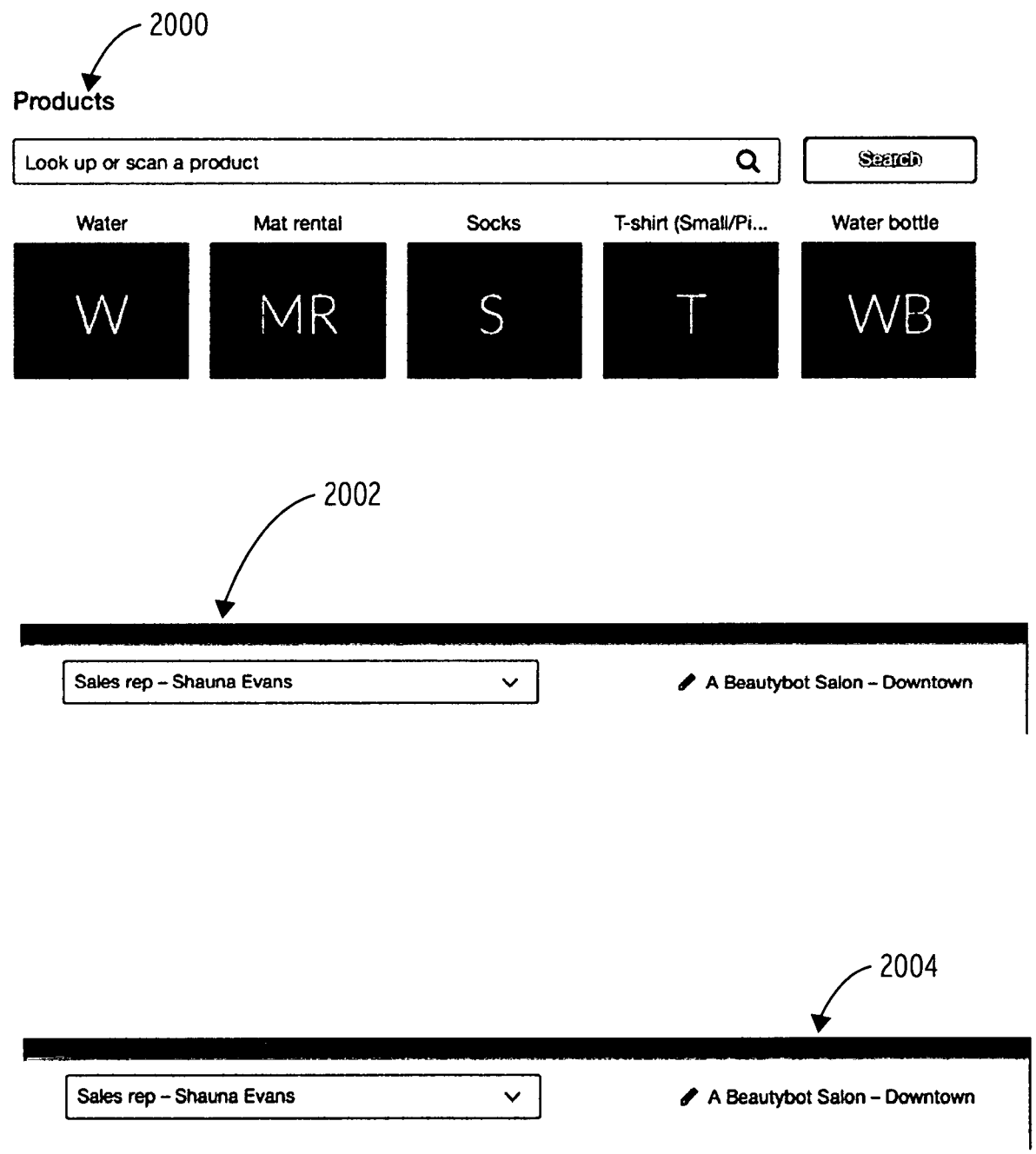

With reference to FIG. 20, the configurable tool 1602 allows the selling of related products as well as services (2000), the assignment of sales representatives (2002), and the selection of a multiple locations (2004).

Figure 21:
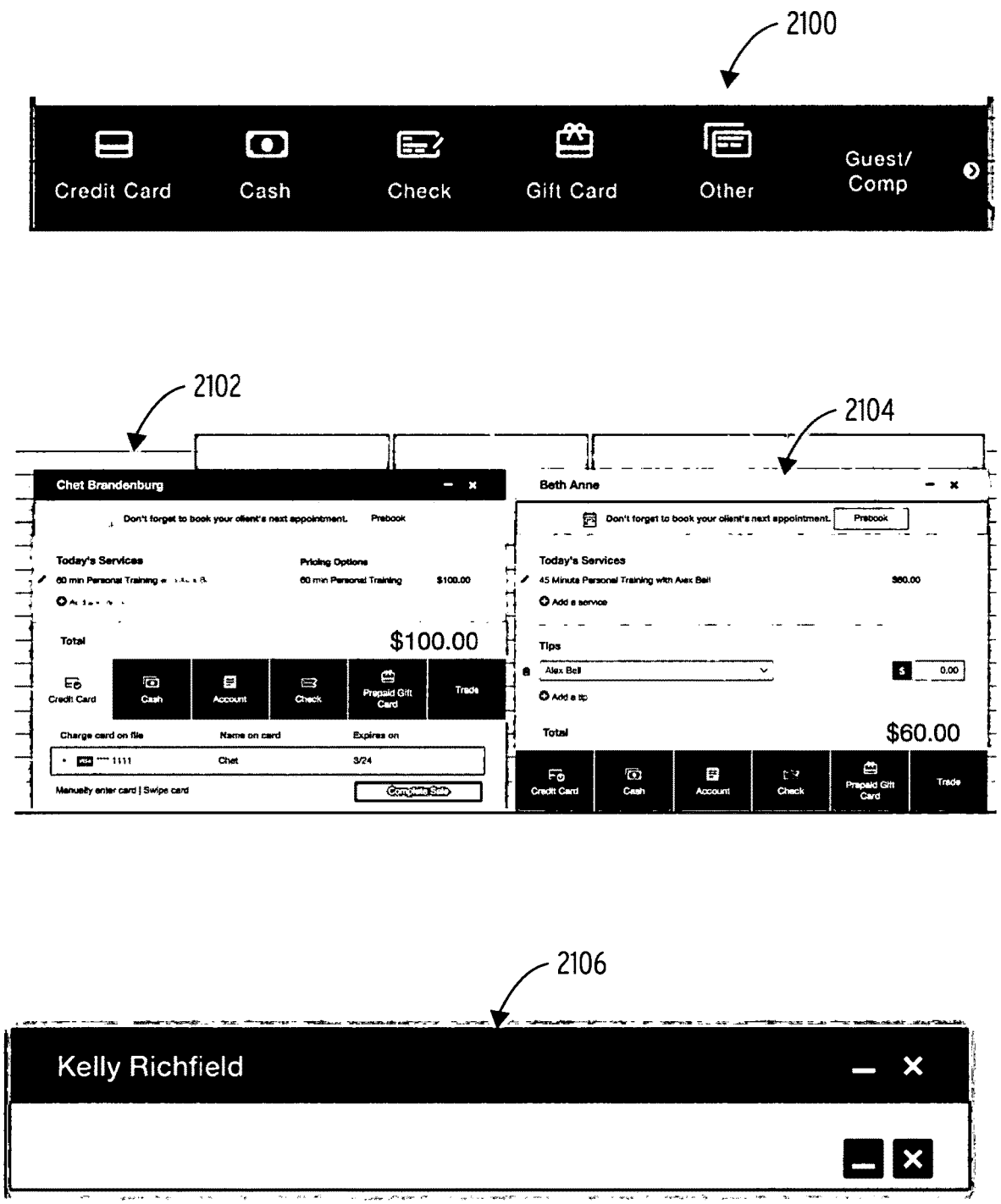

With reference to FIG. 21, the tool 1602 can similarly be configured to allow payment for services by many methods (2100), the ability to work with multiple checkout carts simultaneously (e.g. carts 2102 and 2104), and the ability to minimize (or "dock") and maximize carts (2106).

Thus, in one embodiment, there is provided a scheduling system including an interactive graphical user interface including a first array of cells displayed within the graphical user interface, each cell having a position in the first array of cells, each cell having respective scheduling data associated with it, and each cell being visually translocatable out of the first array under a user navigation to another position within the interface, a second array of cells displayed within the interface, some cells in the second array corresponding to open time slots in a schedule; a scheduling module configured to receive a user selection of a first cell in the first array of cells, identify, based on at least some of the scheduling data associated with the selected first cell, a matching open time slot in the second array of cells, control, under a user navigation, a visual translocation of the first cell from its position in the first array of cells to the matching open time slot position in the second array of cells, and associate or transfer at least some of the scheduling data associated with the first cell to the open time slot position in the second array of cells; and a database for storing the scheduling data in association with the cell in the first and second arrays of cells.

In one embodiment, the scheduling module is further configured to place a temporary marker in the matching open slot in the second array of cells in response to identifying the matching open slot and before controlling the visual translocation of the first cell from its position in the first array of cells to the matching open time slot.

In one embodiment, the scheduling module is further configured to control the visual translocation of the first cell from its position in the first array to the matching open position in the second array in response to a drag-and-drop user navigation.

In one embodiment, the scheduling data associated with each cell in the first array of cells comprises at least one of the group comprising: a location, a time, a time period, a date, a service, a service provider, and a user identification.

In one embodiment, the second array of cells is configured or arranged based in part on at least one aspect of the scheduling data associated with each cell in the first array of cells.

The present subject matter also includes scheduling processes. With reference to FIG. 22, a scheduling process 2200 may include, at operation 2202, providing an interactive graphical user interface; at 2204, displaying a first array of cells within the interface, each cell having a position in the first array of cells, each cell having respective scheduling data associated with it, and each cell being visually translocatable out of the first array under user navigation to another position within the interface; at 2206, displaying a second array of cells within the interface, some cells in the second array corresponding to open time slots in a schedule; at 2208, receiving a user selection of a first cell in the first array of cells; at 2210, identifying, based on at least some of the scheduling data associated with the selected first cell, a matching open time slot in the second array of cells; at 2212, controlling, under a user navigation, a visual translocation of the first cell from its position in the first array of cells to the matching open time slot position in the second array of cells; at 2214, associating or transferring at least some of the scheduling data associated with the first cell to the open time slot position in the second array of cells; and, at 2216, storing in a database the scheduling data in association with the first cell in the first and second arrays of cells.

The scheduling process may further comprise placing a temporary marker in the matching open slot in the second array of cells in response to identifying the matching open slot and before controlling the visual translocation of the first cell from its position in the first array of cells to the matching open time slot.

The scheduling process may further comprise controlling the visual translocation of the first cell from its position in the first array to the matching open position in the second array in response to a drag-and-drop user navigation.

The scheduling data associated with each cell in the first array of cells may comprise at least one of the group comprising: a location, a time, a time period, a date, a service, a service provider, and a user identification.

The scheduling process may further comprising configuring or arranging the second array of cells based in part on at least one aspect of the scheduling data associated with each cell in the first array of cells.

A machine readable medium storing instructions to perform these operations is also provided.

The invention claimed is:
1. A method, comprising:
generating, by a computing system, an interactive graphical user interface, the interactive graphical user interface comprising:
a first portion comprising a plurality of visually movable cells associated with a plurality of clients, wherein each cell of the plurality of visually movable cells represents a previously scheduled appointment of a selected client previously scheduled with at least one of a plurality of service providers, each cell of the plurality of visually movable cells comprises scheduling data associated therewith; and
a second portion associated with a scheduling section, wherein the second portion comprises a plurality of columns representing a plurality of service providers, wherein each column corresponds to a service provider of the plurality of service providers, a plurality of rows, wherein each row corresponds to a date and time, and a plurality of pre-existing cells, each pre-existing cell corresponding to an upcoming appointment;

presenting, by the computing system, the interactive graphical user interface on a display associated with an administrative device;

receiving, by the computing system, a request to rebook an appointment for a first client;

responsive to receiving the request, identifying, by the computing system, a plurality of previously scheduled appointments for the first client previously scheduled with at least one of the plurality of service providers;

upon identifying the plurality of previously scheduled appointments, generating, by the computing system, a first set of visually movable cells for display in the first portion, wherein the first set of visually movable cells represents the plurality of previously scheduled appointments for the first client;

populating, by the computing system, the first set of visually movable cells in the first portion of the interactive graphical user interface;

receiving, by the computing system, an indication of a new appointment for the first client, wherein the indication comprises movement of a first visually movable cell of the first set of visually movable cells from the first portion of the interactive graphical user interface to the second portion;

upon receiving the indication, determining, by the computing system, a location of the first visually movable cell within the second portion; and based on the location of the first visually movable cell within the second portion, generating, by the computing system, a new upcoming appointment for the first client based on the location of the first visually movable cell in the second portion and populating the new upcoming appointment with the scheduling data corresponding to a previously scheduled appointment previously scheduled with at least one of the plurality of service providers associated with the first visually movable cell.

2. The method of claim 1, wherein determining, by the computing system, the location of the first visually movable cell within the second portion comprises:

determining a column of the plurality of columns corresponding to the location of the first visually movable cell; and determining at least one row of the plurality of rows corresponding to the location of the first visually movable cell.

3. The method of claim 2, wherein generating, by the computing system, the new upcoming appointment for the first client based on the location of the first visually movable cell in the second portion and populating the new upcoming appointment with the scheduling data corresponding to the previously scheduled appointment associated with the first visually movable cell comprises:

identifying a f first service provider associated with the column corresponding to the location of the first visually movable cell;

identifying a first time and a first date associated with the column corresponding to the location of the first visually movable cell; and scheduling the new upcoming appointment with the service provider at the first time and the first date.

4. The method of claim 1, wherein generating, by the computing system, the new upcoming appointment for the first client based on the location of the first visually movable cell in the second portion and populating the new upcoming appointment with the scheduling data corresponding to the previously scheduled appointment associated with the first visually movable cell comprises:

scheduling the new upcoming appointment for a type of service described in the scheduling data of the first visually movable cell.

5. The method of claim 1, wherein an overlay window with details of a prior appointment is generated upon detecting a hovering input over a cell of the first set of visually movable cells.

6. The method of claim 1, further comprising:

receiving, by the computing system, a second request to rebook a second appointment for a second client;

responsive to receiving the request, identifying, by the computing system, a second plurality of previously scheduled appointments for the second client; and upon identifying the second plurality of previously scheduled appointments, generating, by the computing system, a second set of visually movable cells for display in the first portion, wherein the second set of visually movable cells corresponds to the second plurality of previously scheduled appointments for the second client.

7. A system, comprising:

an interactive graphical user interface, comprising:

a first portion comprising a plurality of visually movable cells associated with a plurality of clients, wherein each cell of the plurality of visually movable cells represents a previously scheduled appointment of a selected client previously scheduled with at least one of a plurality of service providers, each cell of the plurality of visually movable cells comprising scheduling data associated therewith; and a second portion associated with a scheduling section, wherein the second portion comprises a plurality of columns representing the plurality of service providers, wherein each column corresponds to a service provider of the plurality of service providers, a plurality of rows, wherein each row corresponds to a date and time, and a plurality of pre-existing cells, each pre-existing cell corresponding to an upcoming appointment; and a processor configured to perform operations, comprising:

presenting, by the processor, the interactive graphical user interface;

receiving, by the processor, a request to rebook an appointment for a first client;

responsive to receiving the request, identifying, by the processor, a plurality of previously scheduled appointments for the first client previously scheduled with at least one of the plurality of service providers;

upon identifying the plurality of previously scheduled appointments, generating, by the processor, a first set of visually movable cells for display in the first portion, wherein the first set of visually movable cells represents to the plurality of previously scheduled appointments for the first client;

populating, by the processor, the first set of visually movable cells in the first portion of the interactive graphical user interface;

receiving, by the processor, an indication of a new appointment for the first client, wherein the indication comprises movement of a first visually movable cell of the first set of visually movable cells from the first portion of the interactive graphical user interface to the second portion;

upon receiving the indication, determining, by the processor, a location of the first visually movable cell within the second portion; and based on the location of the first visually movable cell within the second portion, generating, by the processor, a new upcoming appointment for the first client based on the location of the first visually movable cell in the second portion and populating the new upcoming appointment with the scheduling data corresponding to a previously scheduled appointment previously scheduled with at least one of the plurality of service providers associated with the first visually movable cell.

8. The system of claim 7, wherein determining, by the processor, the location of the first visually movable cell within the second portion comprises:

determining a column of the plurality of columns corresponding to the location of the first visually movable cell; and determining at least one row of the plurality of rows corresponding to the location of the first visually movable cell.

9. The system of claim 8, wherein generating, by the processor, the new upcoming appointment for the first client based on the location of the first visually movable cell in the second portion and populating the new upcoming appointment with the scheduling data corresponding to the previously scheduled appointment associated with the first visually movable cell comprises:

identifying a f first service provider associated with the column corresponding to the location of the first visually movable cell;

identifying a first time and a first date associated with the column corresponding to the location of the first visually movable cell; and scheduling the new upcoming appointment with the service provider at the first time and the first date.

10. The system of claim 7, wherein generating, by the processor, the new upcoming appointment for the first client based on the location of the first visually movable cell in the second portion and populating the new upcoming appointment with the scheduling data corresponding to the previously scheduled appointment associated with the first visually movable cell comprises:

scheduling the new upcoming appointment for a type of service described in the scheduling data of the first visually movable cell.

11. The system of claim 7, wherein an overlay window with details of a prior appointment is generated upon detecting a hovering input over a cell of the first set of visually movable cells.

12. The system of claim 7, wherein the operations further comprise:

receiving, by the processor, a second request to rebook a second appointment for a second client;

responsive to receiving the request, identifying, by the processor, a second plurality of previously scheduled appointments for the second client; and upon identifying the second plurality of previously scheduled appointments, generating, by the processor, a second set of visually movable cells for display in the first portion, wherein the second set of visually movable cells corresponds to the second plurality of previously scheduled appointments for the second client.

13. A non-transitory computer readable medium having a sequence of instructions, which, when executed by a processor, causes a computing system to perform operations, comprising:

presenting, by the computing system, an interactive graphical user interface, the interactive graphical user interface comprising:

a first portion comprising a plurality of visually movable cells associated with a plurality of clients, wherein each cell of the plurality of visually movable cells represents a previously scheduled appointment of a selected client previously scheduled with at least one of a plurality of service providers, each cell of the plurality of visually movable cells comprising scheduling data associated therewith; and a second portion associated with a scheduling section, wherein the second portion comprises a plurality of columns representing the plurality of service providers, wherein each column corresponds to a service provider of the plurality of service providers, a plurality of rows, wherein each row corresponds to a date and time, and a plurality of pre-existing cells, each pre-existing cell corresponding to an upcoming appointment;

receiving, by the computing system, a request to rebook an appointment for a first client;

responsive to receiving the request, identifying, by the computing system, a plurality of previously scheduled appointments for the first client previously scheduled with at least one of the plurality of service providers;

upon identifying the plurality of previously scheduled appointments, generating, by the computing system, a first set of visually movable cells for display in the first portion, wherein the first set of visually movable cells represents the plurality of previously scheduled appointments for the first client;

populating, by the computing system, the first set of visually movable cells in the first portion of the interactive graphical user interface;

receiving, by the computing system, an indication of a new appointment for the first client, wherein the indication comprises movement of a first visually movable cell of the first set of visually movable cells from the first portion of the interactive graphical user interface to the second portion;

upon receiving the indication, determining, by the computing system, a location of the first visually movable cell within the second portion; and based on the location of the first visually movable cell within the second portion, generating, by the computing system, a new upcoming appointment for the first client based on the location of the first visually movable cell in the second portion and populating the new upcoming appointment with the scheduling data corresponding to a previously scheduled appointment previously scheduled with at least one of the plurality of service providers associated with the first visually movable cell.

14. The non-transitory computer readable medium of claim 13, wherein determining, by the computing system, the location of the first visually movable cell within the second portion comprises:

determining a column of the plurality of columns corresponding to the location of the first visually movable cell; and determining at least one row of the plurality of rows corresponding to the location of the first visually movable cell.

15. The non-transitory computer readable medium of claim 14, wherein generating, by the computing system, the new upcoming appointment for the first client based on the location of the first visually movable cell in the second portion and populating the new upcoming appointment with the scheduling data corresponding to the previously scheduled appointment associated with the first visually movable cell comprises:

identifying a f first service provider associated with the column corresponding to the location of the first visually movable cell;

identifying a first time and a first date associated with the column corresponding to the location of the first visually movable cell; and scheduling the new upcoming appointment with the service provider at the first time and the first date.

16. The non-transitory computer readable medium of claim 13, wherein generating, by the computing system, the new upcoming appointment for the first client based on the location of the first visually movable cell in the second portion and populating the new upcoming appointment with the scheduling data corresponding to the previously scheduled appointment associated with the first visually movable cell comprises:

scheduling the new upcoming appointment for a type of service described in the scheduling data of the first visually movable cell.

17. The non-transitory computer readable medium of claim 13, wherein an overlay window with details of a prior appointment is generated upon detecting a hovering input over a cell of the first set of visually movable cells.

* * * * *